US010209472B2

(12) United States Patent
Estrada Gonzalez et al.

(10) Patent No.: US 10,209,472 B2
(45) Date of Patent: Feb. 19, 2019

(54) CABLE ROUTING SYSTEM EXIT STRUCTURE

(71) Applicant: COMMSCOPE TECHNOLOGIES LLC, Hickory, NC (US)

(72) Inventors: Erik Estrada Gonzalez, Chihuahua (MX); Hector Gustavo Ureno, Chihuahua (MX); Paul Kmit, Maple Grove, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/892,971

(22) PCT Filed: May 20, 2014

(86) PCT No.: PCT/US2014/038818
§ 371 (c)(1),
(2) Date: Nov. 20, 2015

(87) PCT Pub. No.: WO2014/189950
PCT Pub. Date: Nov. 27, 2014

(65) Prior Publication Data
US 2016/0116700 A1    Apr. 28, 2016

Related U.S. Application Data

(60) Provisional application No. 61/825,369, filed on May 20, 2013, provisional application No. 61/883,741, (Continued)

(51) Int. Cl.
*G02B 6/44* (2006.01)
*G02B 6/46* (2006.01)

(52) U.S. Cl.
CPC ......... *G02B 6/4459* (2013.01); *G02B 6/4463* (2013.01); *G02B 6/4478* (2013.01); *G02B 6/46* (2013.01); *G02B 6/4473* (2013.01)

(58) Field of Classification Search
None
See application file for complete search history.

(56) References Cited

U.S. PATENT DOCUMENTS 5,477,649 A * 12/1995 Bessert ............... H02G 3/285
174/486
6,165,055 A   12/2000 Takahashi et al.
(Continued)

FOREIGN PATENT DOCUMENTS

DE        3742448 A1 *  6/1989
JP       2012-511303       5/2012
(Continued)

OTHER PUBLICATIONS

Opinion from European application 14894812.8 dated Feb. 21, 2017.*
(Continued)

*Primary Examiner* — Michael Stahl
(74) *Attorney, Agent, or Firm* — Merchant & Gould P.C.

(57) ABSTRACT

An example exit structure for a cable routing system includes: a fitting configured to be coupled to a lateral trough, the fitting including first and second arms extending perpendicularly with respect to a longitudinal direction; a plate positioned relative to the fitting, wherein the plate is configured to slide relative to the fitting to adjust a distance the plate extends perpendicularly from a base of the lateral trough; and an exit component coupled to the plate, the exit component defining a surface directing a fiber optic cable out of the exit structure.

31 Claims, 36 Drawing Sheets

Related U.S. Application Data filed on Sep. 27, 2013, provisional application No. 61/884,699, filed on Sep. 30, 2013, provisional application No. 61/910,727, filed on Dec. 2, 2013.

(56) References Cited

U.S. PATENT DOCUMENTS

| | | |
|---|---|---|
| 7,079,744 B2 | 7/2006 | Douglas et al. |
| 7,226,022 B2 * | 6/2007 | Bernard ............... H02G 3/0608 248/68.1 |
| 7,315,680 B1 * | 1/2008 | Rapp ................... G02B 6/4459 248/68.1 |
| 2004/0124321 A1 | 7/2004 | Kampf et al. |
| 2005/0239378 A1 | 10/2005 | Bianchi |
| 2008/0175554 A1 | 7/2008 | Coburn et al. |
| 2011/0074117 A1 | 3/2011 | Caveney et al. |
| 2011/0211791 A1 | 9/2011 | Wu |
| 2012/0294581 A1 | 11/2012 | Takisaki et al. |
| 2012/0302145 A1 | 11/2012 | Bitter et al. |

FOREIGN PATENT DOCUMENTS

| | | |
|---|---|---|
| WO | 03/084018 A1 | 10/2003 |
| WO | 2009/138029 A1 | 11/2009 |

OTHER PUBLICATIONS

Search Report for European Patent Application No. 14894812.8, dated Feb. 21, 2017, 9 pages. (Year: 2017).*

International Search Report and Written Opinion for International Application No. PCT/US2014/038818 dated Sep. 17, 2014 (11 pages).

* cited by examiner

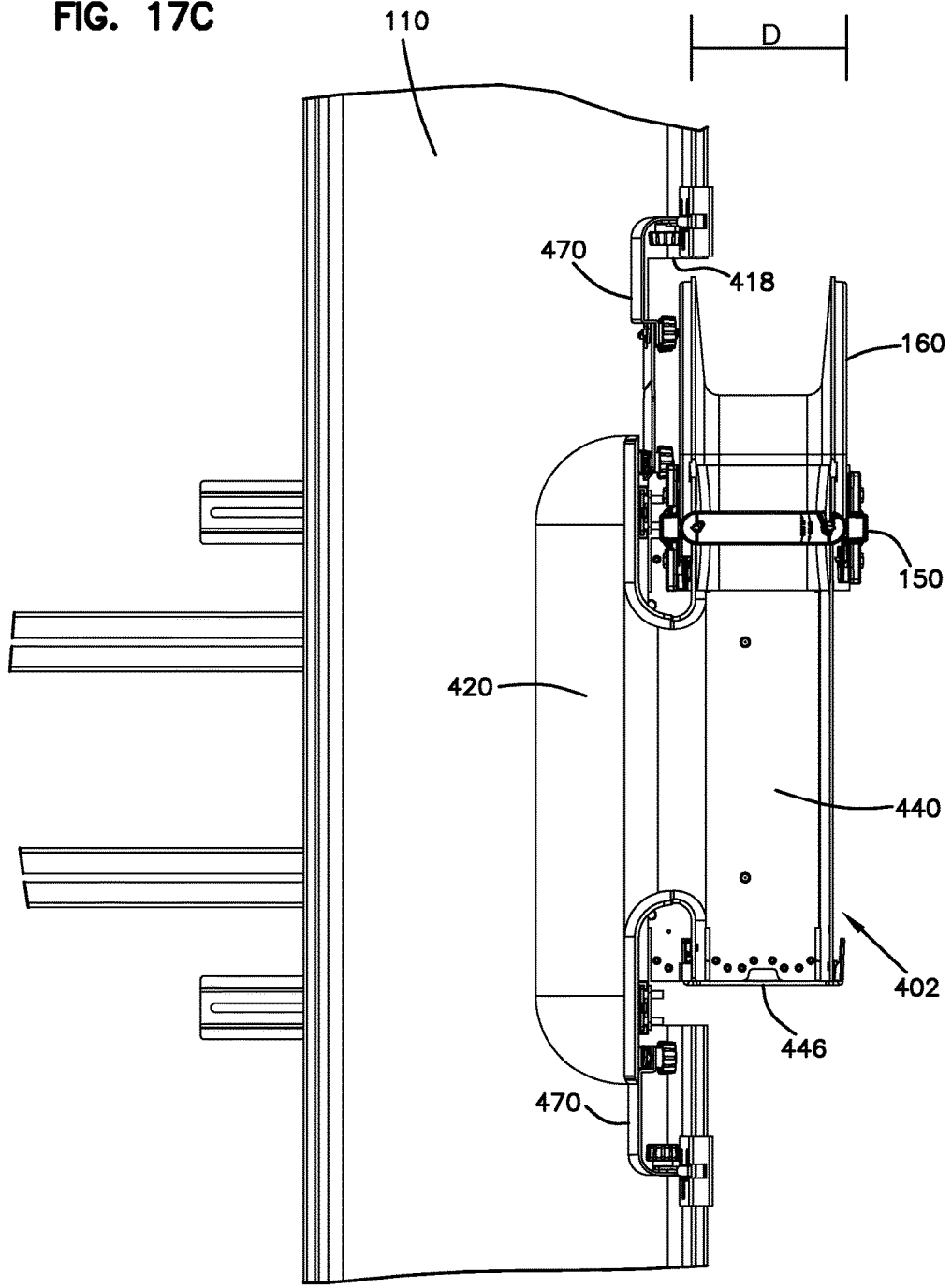

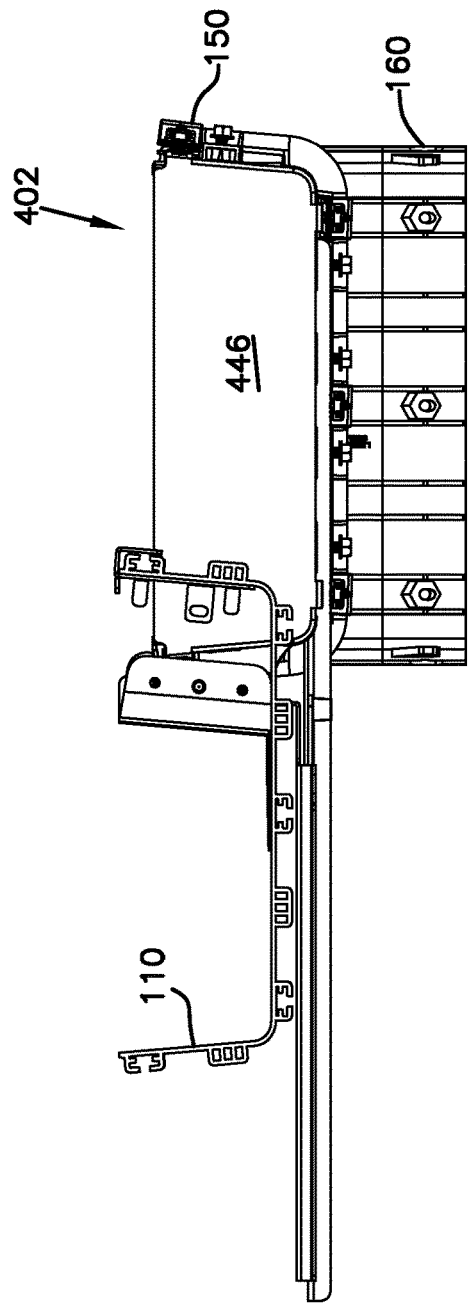

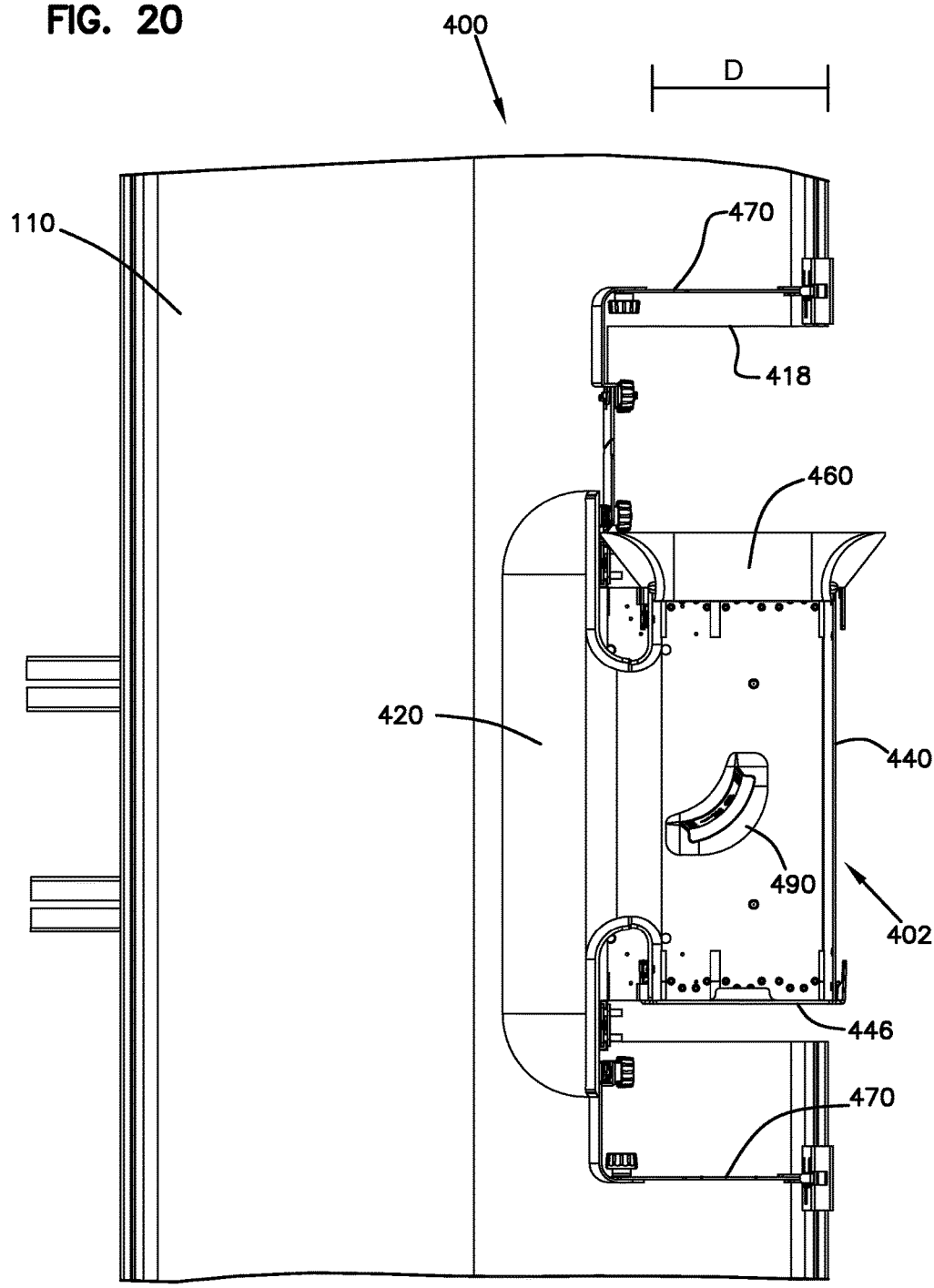

CABLE ROUTING SYSTEM EXIT STRUCTURE

CROSS-REFERENCE TO RELATED APPLICATION(S)

This application is a National Stage of PCT International Patent application No. PCT/US2014/038818, filed 20 May 2014 and claims benefit to U.S. Patent Application Ser. No. 61/910,727 filed on Dec. 2, 2013, U.S. Patent Application Ser. No. 61/884,699 filed on Sep. 30, 2013, U.S. Patent Application Ser. No. 61/883,741 filed on Sep. 27, 2013, and U.S. Patent Application Ser. No. 61/825,369 filed on May 20, 2013and which applications are incorporated herein by reference. To the extent appropriate, a claim of priority is made to each of the above disclosed applications.

BACKGROUND

In the telecommunications industry, the use of optical fibers for signal transmissions is accelerating. With the increased utilization of optical fiber systems, fiber optic cable management requires industry attention. One area where optical fiber management is necessary is the routing of optical fibers from one piece of optical fiber equipment to another. For example, in a telecommunications facility, fiber optic cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical which would require a high capital outlay and which could not be readily adapted to changes in a customer's needs. Namely, if routing paths, once established, are forever fixed, the system cannot adapt. Also, any routing system must protect optical fibers from damage. In the use of optical fibers, it is recognized that the fibers should not be bent beyond a minimum radius of curvature. For example, it is commonly recognized that optical fibers should not be bent in a radius of less than a specified amount.

SUMMARY

In one aspect, an exit structure for a cable routing system includes: a fitting configured to be coupled to a lateral trough, the fitting including first and second arms extending perpendicularly with respect to a longitudinal direction; a plate positioned relative to the fitting, wherein the plate is configured to slide relative to the fitting to adjust a distance the plate extends perpendicularly from a base of the lateral trough; and an exit component coupled to the plate, the exit component defining a surface directing a fiber optic cable out of the exit structure.

In another aspect, a cable routing system includes: a lateral trough extending in a longitudinal direction to define a cable pathway, the lateral trough including a base and first and second upstanding sidewalls, with one of the first and second upstanding sidewalls defining an opening extending along the lateral trough; and an exit structure coupled to the lateral trough at the opening of the lateral trough, the exit structure including: a fitting coupled to the lateral trough, the fitting including first and second arms extending perpendicularly with respect to the longitudinal direction; a plate positioned relative to the fitting, wherein the plate is configured to slide relative to the fitting to adjust a distance the plate extends perpendicularly from the base of the lateral trough; and an exit component coupled to the plate, the exit component defining a surface directing an optical cable out of the exit structure.

In yet another aspect, a method of routing fiber optic cables includes:

forming an opening in a sidewall of a lateral trough; coupling a fitting to the lateral trough; sliding a plate relative to the fitting so that the plate is a desired distance in a perpendicular direction from the lateral trough; positioning a coupler at the plate; and coupling the coupler to a downspout.

DESCRIPTION OF THE DRAWINGS

FIGS. 17A-D are various views of a seventh embodiment of the cable routing system of FIG. 1.

FIGS. 19A-D are various views of a ninth embodiment of the cable routing system of FIG. 1.

FIG. 20 is a top view of a tenth embodiment of the cable routing system of FIG. 1.

DETAILED DESCRIPTION

The present disclosure is directed towards cable routing systems. Although not so limited, an appreciation of the various aspects of the present disclosure will be gained through a discussion of the examples provided below.

Figure 1:
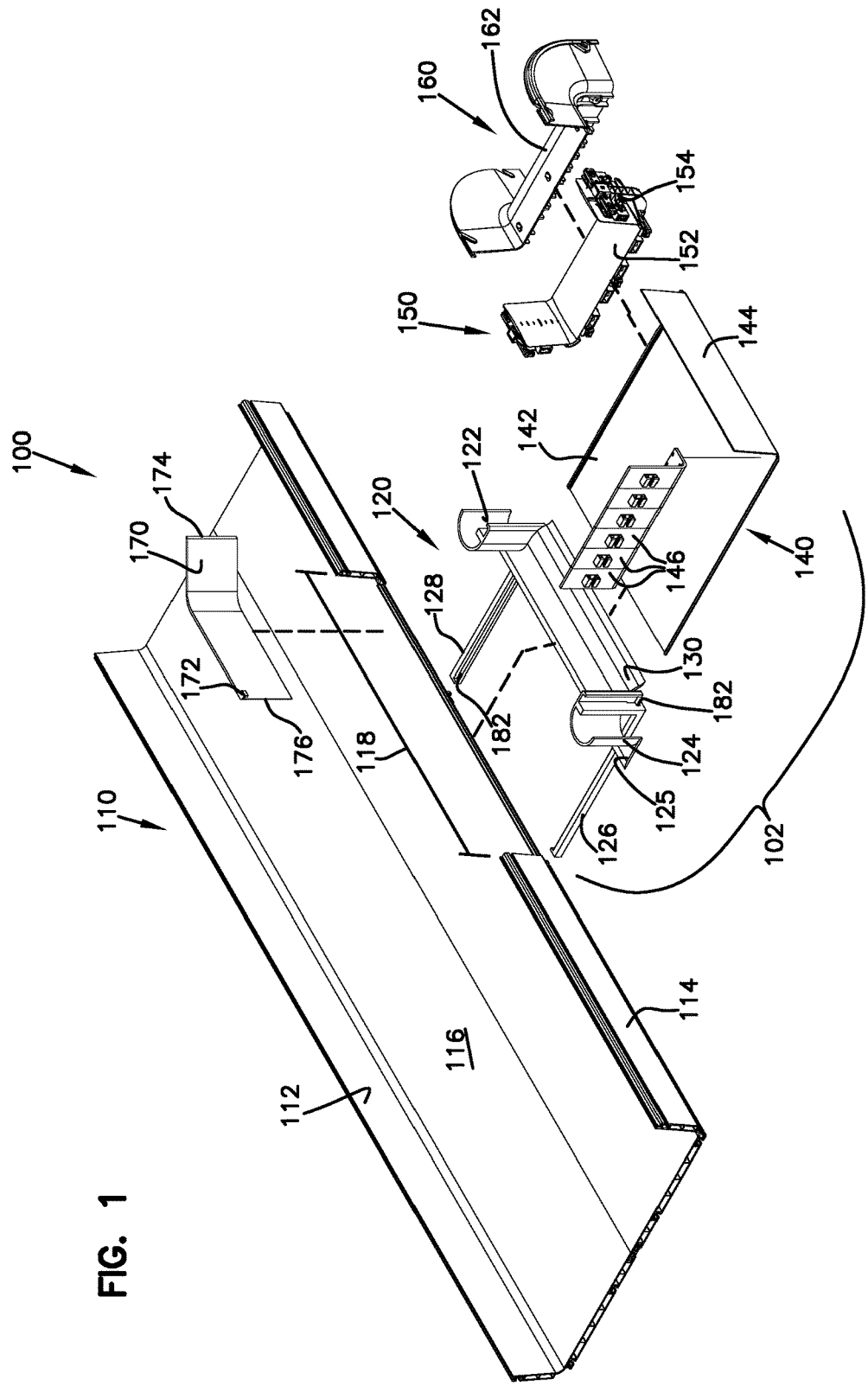
FIG. 1 is an exploded perspective view of an example cable routing system including a lateral trough and an exit structure.
Figure 2:
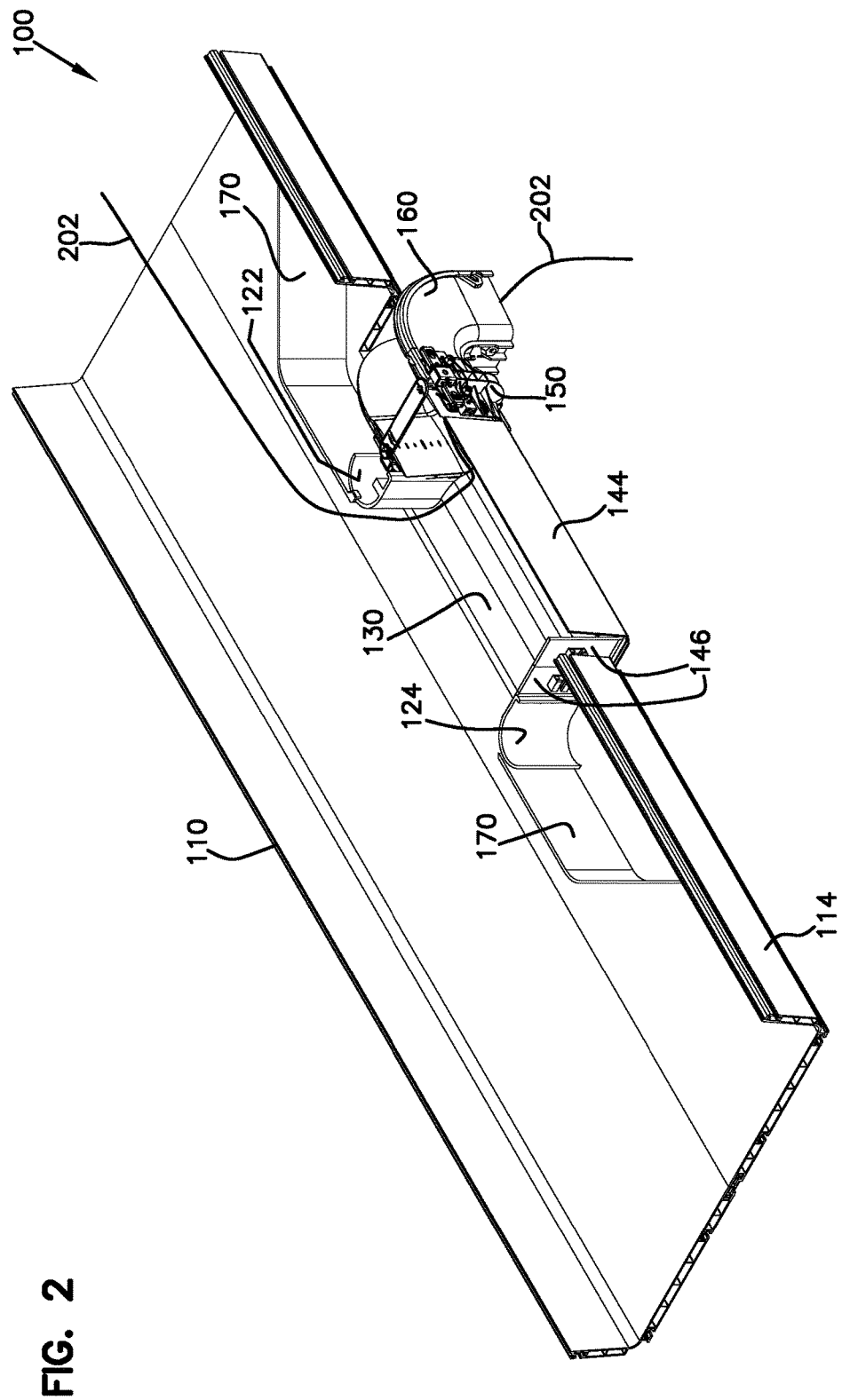
FIG. 2 is a perspective view of a first embodiment of the cable routing system of FIG. 1.

Referring now to FIGS. 1-2, a first embodiment of a cable routing system 100. This system 100 is used to route fiber optic cables and can include a plurality of components, such as troughs, elbows, fittings, couplers, up- and downspouts, etc. In this example, only a portion of the cable routing system 100 is shown.

The cable routing system 100 includes a lateral trough 110 that defines a cable pathway for routing fiber optic cables between locations. The lateral trough 110 includes a base 116 and upstanding sidewalls 112, 114 forming a general U shape. The lateral trough 110 is part of the cable routing system 100 that is typically installed within a structure, such as a building having optical fiber signal transmitting equipment.

The lateral trough 110 can typically be suspended from a ceiling structure by any suitable means (not shown). U.S. Pat. Nos. 5,067,678; 5,316,243; 5,937,131; and 7,742,675 disclose various cable routing systems, including lateral troughs like lateral trough 110 described herein. All of these patents are hereby incorporated by reference.

In this example, the lateral trough 110 is 24 inches in width and is formed from multiple pieces, such as that described in U.S. Pat. No. 7,742,675. However, in other examples, the lateral trough can be larger or smaller. For example, the lateral trough can also have widths such as 4 inches, 6 inches, or 12 inches and be formed as an integral unit.

As illustrated, the cable routing system 100 also includes an exit structure 102 that generally allows fiber optic cables to exit the lateral trough 110. The exit structure 102 includes a fitting 120, a plate 140, a coupler 150, a downspout 160, and a bracket 170.

The fitting 120 of the exit structure 102 is sized to engage the lateral trough 110, as described further below. The fitting 120 includes members 122, 124 formed on the sides of the fitting 120 to maintain each of the fiber optic cables exiting through the fitting 120 at a proper bend radius. In addition, the fitting 120 includes arms 126, 128 that extend towards the lateral trough 110. A portion 125 of the member 122 and arm 128 form a space therebetween, as does the member 124 and the arm 126. This space is sized to accept a portion of the base 116, as described further below. Finally, the fitting 120 includes an exit surface 130 leading to the plate 140.

The plate 140 of the exit structure 102 includes a main surface 142 and an upstanding sidewall 144. The main surface 142 is sized to be received in grooves 182 formed in the arms 126, 128 of the fitting 120, as described further below. Also, the plate 140 includes an adjustable sidewall formed of sidewall members 146. The sidewall members 146 can be added or removed depending on the configuration of the exit structure 102, which is described further below. The sidewall members 146 can be connected to the main surface 142 of the plate 140 using various fasteners, such as screws, tacks, or adhesive. In this example, each of the sidewall members 146 is 2 inches in width, although other sizes are possible. See, e.g., FIG. 13 described below.

The coupler 150 of the exit structure 102 includes a guiding surface 152 and locking elements 154 that are used to couple different components. In this example, the plate 140 and the downspout 160 are sized to fit within a space formed by the coupler 150 between the guiding surface 152 and the locking elements 154 to hold the plate 140 and the downspout 160 in the desired position. Additional details on example couplers are found in U.S. Pat. No. 7,093,997, which is hereby incorporated by reference.

The downspout 160 of the exit structure 102 is an example of an exit component. The downspout 160 is coupled to the coupler 150. The downspout includes a curved guiding surface 162 that guides the fiber optic cables out of (e.g., downward from) the exit structure 102 to telecommunications equipment located beneath the lateral trough 110.

The bracket 170 of the exit structure 102 is configured to close any gaps formed when the exit structure 102 is coupled to the lateral trough 110. The bracket 170 provides a smooth transition from the lateral trough 110 to the exit structure 102. The bracket 170 includes a first end 174 configured to be positioned adjacent to the sidewall 114, and a second end 176 configured to be positioned adjacent to the member 122 of the fitting 120. In addition, the bracket 170 includes a tab 172 positioned to engage the member 122 to hold the bracket 170 in place.

In example embodiments, the exit structure 102 is coupled to the lateral trough 110 to allow fiber optic cables (see FIGS. 2-4) positioned within the lateral trough 110 to exit the lateral trough 110 and access to telecommunications equipment located beneath the lateral trough 110. The exit structure 102 is configurable so that the perpendicular distance the exit structure 102 extends from the lateral trough 110 can be tailored so that the fiber optic cables are correctly positioned when the fiber optic cables exit the lateral trough 110.

Figure 3:
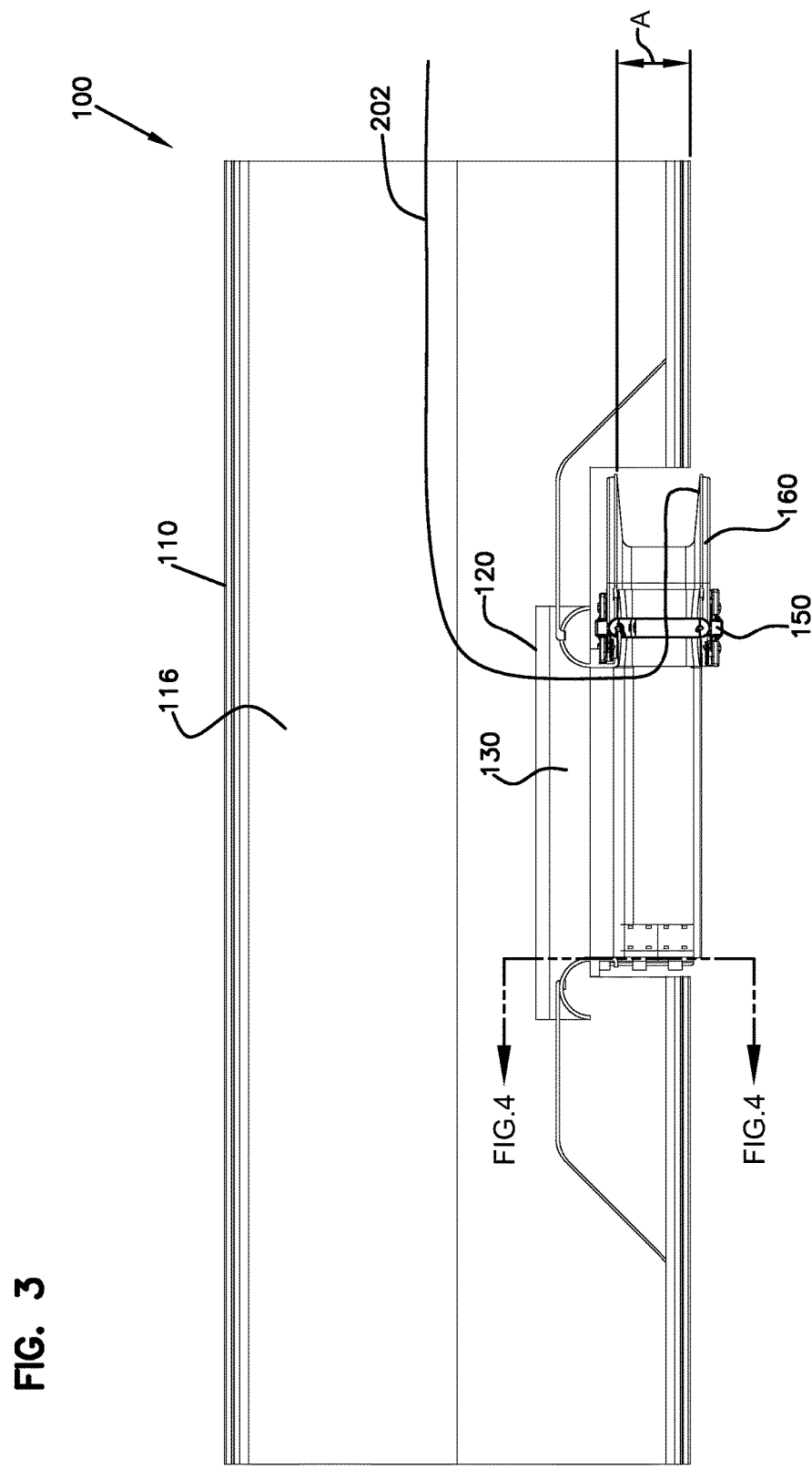
FIG. 3 is top view of the cable routing system of FIG. 2.
Figure 4:
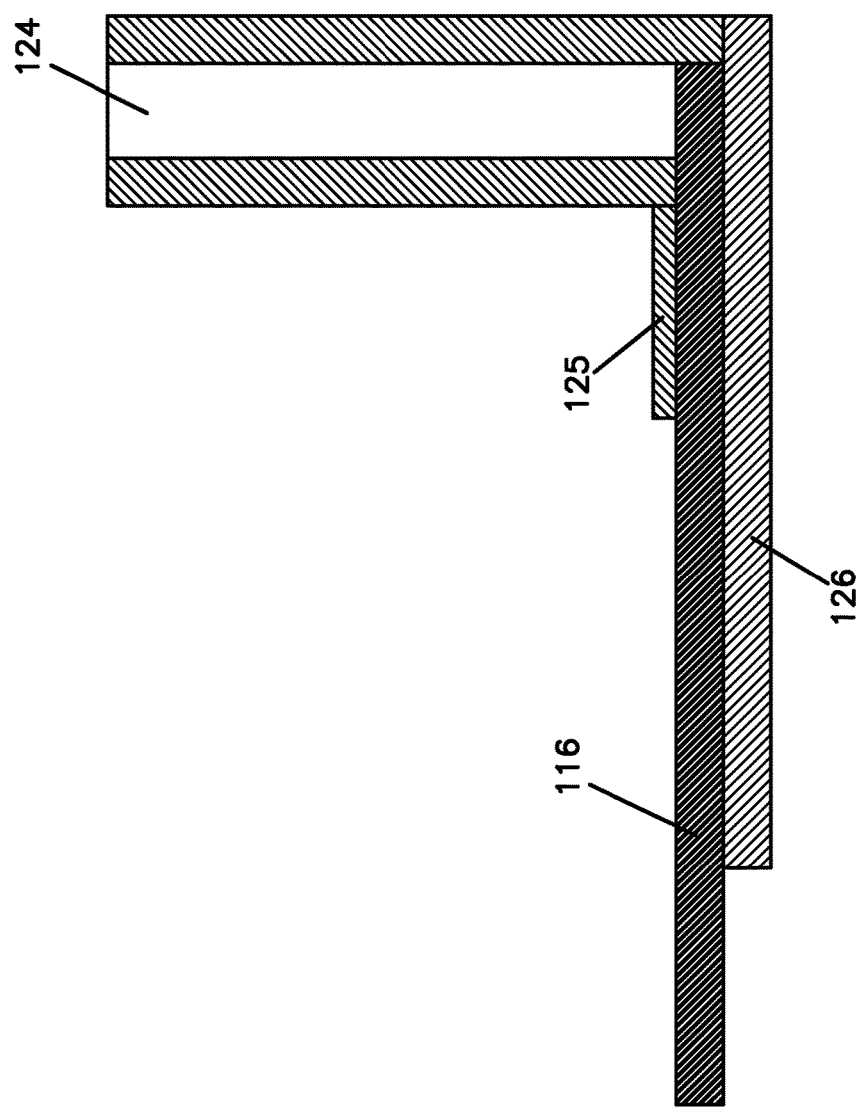
FIG. 4 is a cross-sectional view of a portion of the cable routing system of FIG. 3.

Referring now to FIGS. 2-4, the exit structure 102 is shown coupled to the lateral trough 110 in a first position. In this first position, the exit structure 102 extends inward into the lateral trough 110 a distance A. In this example, the distance is 4 inches, although other distances can be used.

As shown, an opening (see, e.g., opening 118 formed in lateral trough 110 in FIG. 1) is formed in the upstanding wall 114. In addition, in the configuration shown in FIGS. 2-4, the opening extends into the base 116 so that the exit structure 102 extend perpendicularly into the lateral trough 110.

As shown in FIG. 4, the arms 126, 128 and the plate 140 are then slid onto the base 116 of the lateral trough 110 at the opening 118. In this first position shown in FIGS. 2-4, the arms 126, 128 and the plate 140 extend perpendicularly into the lateral trough 110. Specifically, the space formed between the arms 126, 128 and the members 122, 124 receives the base 116 so that the exit structure 102 extends into the lateral trough 110 the distance A.

To accommodate the distance A, the plate 140 is slid within the grooves 182 of the arms so that only two sidewall members 146 are used to form one side of the plate 140, and an appropriately-sized coupler 150 and downspout 160 are used. For example, a 4 inch coupler and downspout can be used in this example.

Finally, two brackets 170 are used to create a smooth transition from the lateral trough 110 to the members 122, 124 of the exit structure 102. An fiber optic cable 202 positioned within the lateral trough 110 is shown exiting the lateral trough 110 at the exit structure 102, through the fitting 120, over the plate 140, and out the coupler 150 and downspout 160 to telecommunications equipment below (not shown).

In some embodiments, the fiber optic cable 202 is protected as the fiber optic cable 202 exits the downspout 160 and extends to the equipment below. For example, a sheath, tubing, or other mechanisms can be used to protect the cable 202.

Figure 5:
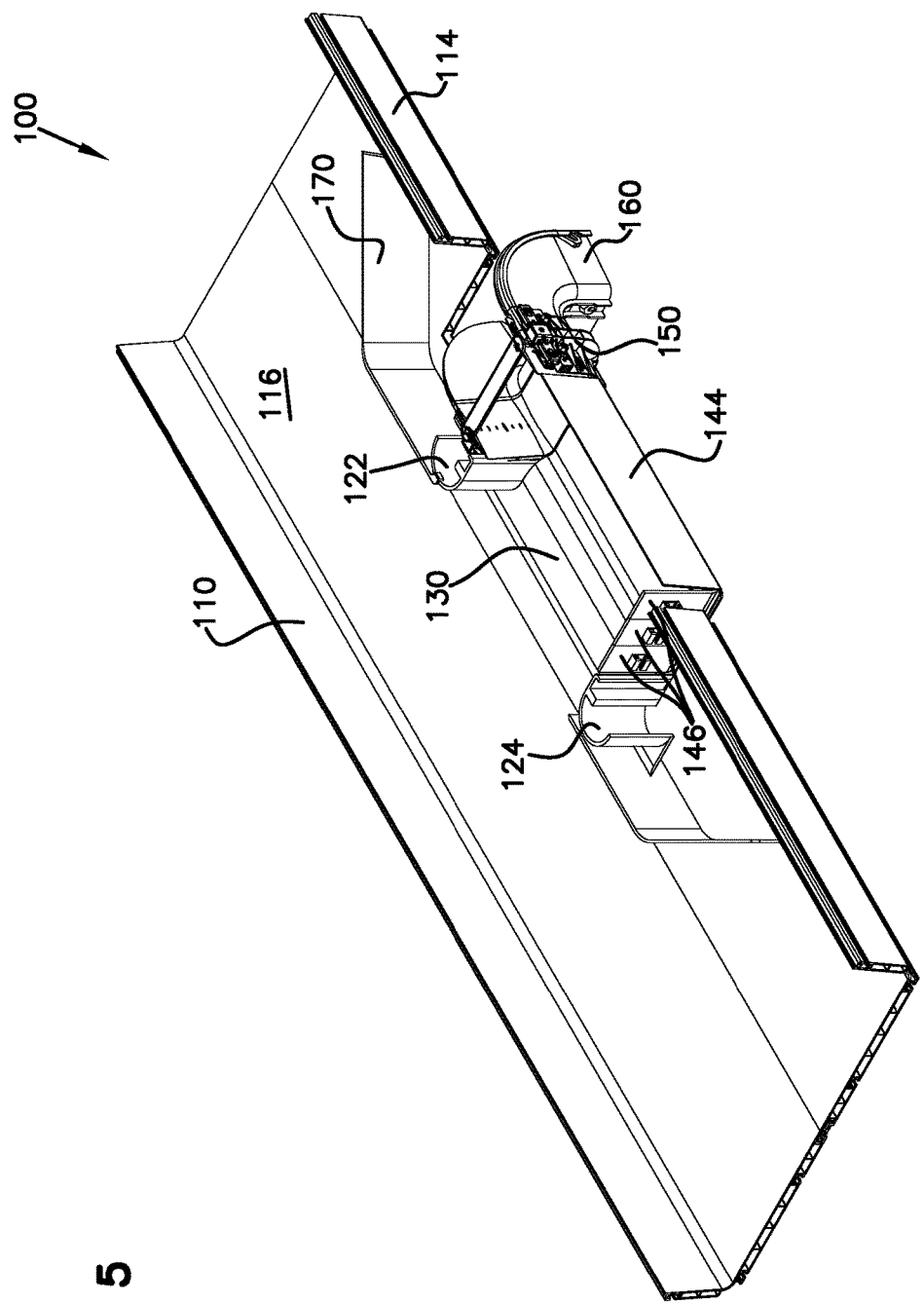
FIG. 5 is a perspective view of a second embodiment of the cable routing system of FIG. 1.
Figure 6:
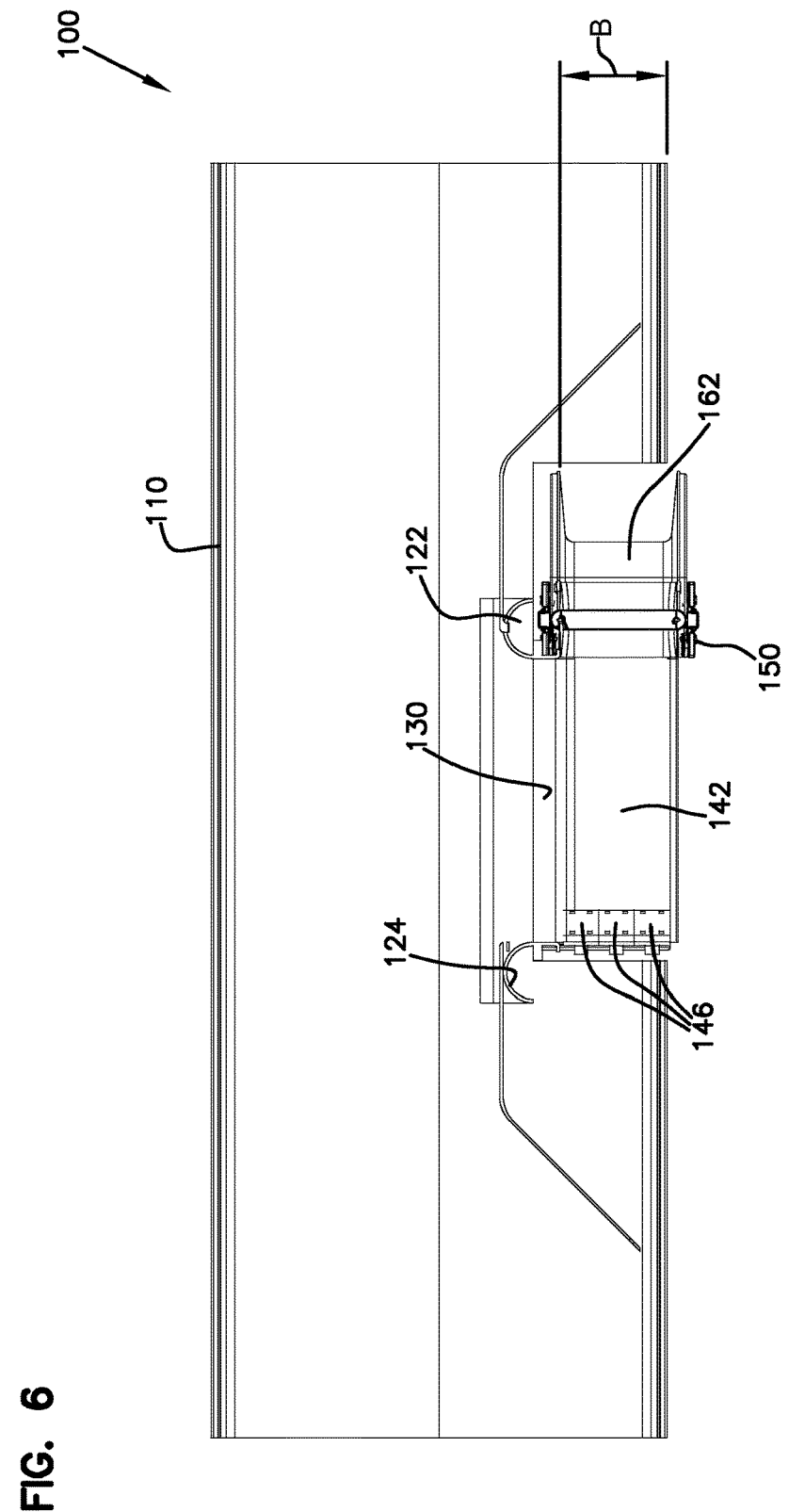
FIG. 6 is top view of the cable routing system of FIG. 5.

Referring now to FIGS. 5-6, another example of the system 100 is shown with the exit structure 102 in a second position. In this example, the exit structure 102 is configured in a same manner as that described above, except that the exit structure 102 extends perpendicularly into the lateral trough 110 a distance B, which is greater than the distance A. In this example, the distance B is 6 inches. To accomplish this configuration, a greater-sized opening is formed in the base 116, more of the plate 140 is exposed, and an additional sidewall member 146 is used. Further, a 6 inch coupler and downspout can be used.

Figure 7:
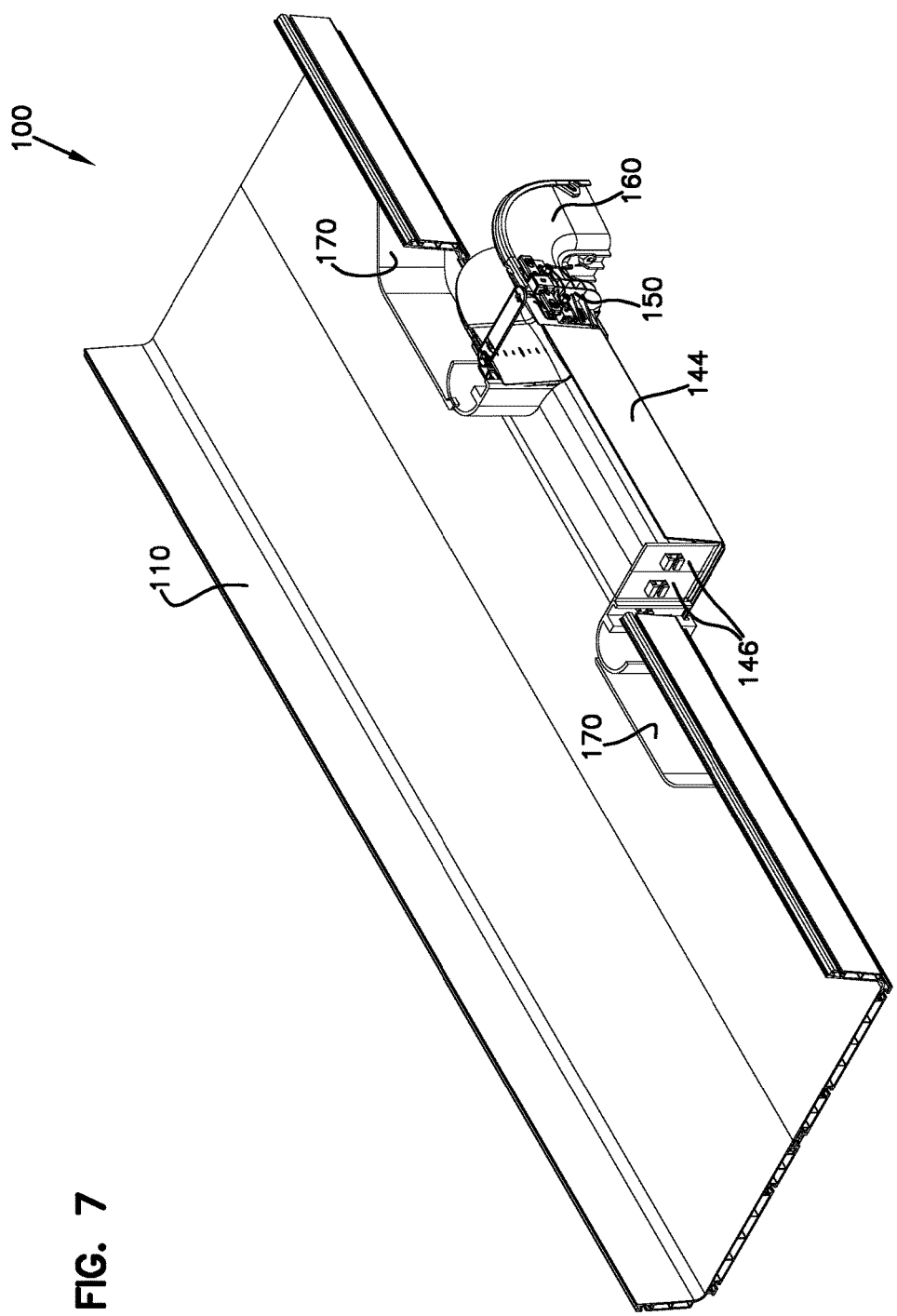
FIG. 7 is a perspective view of a third embodiment of the cable routing system of FIG. 1.
Figure 8:
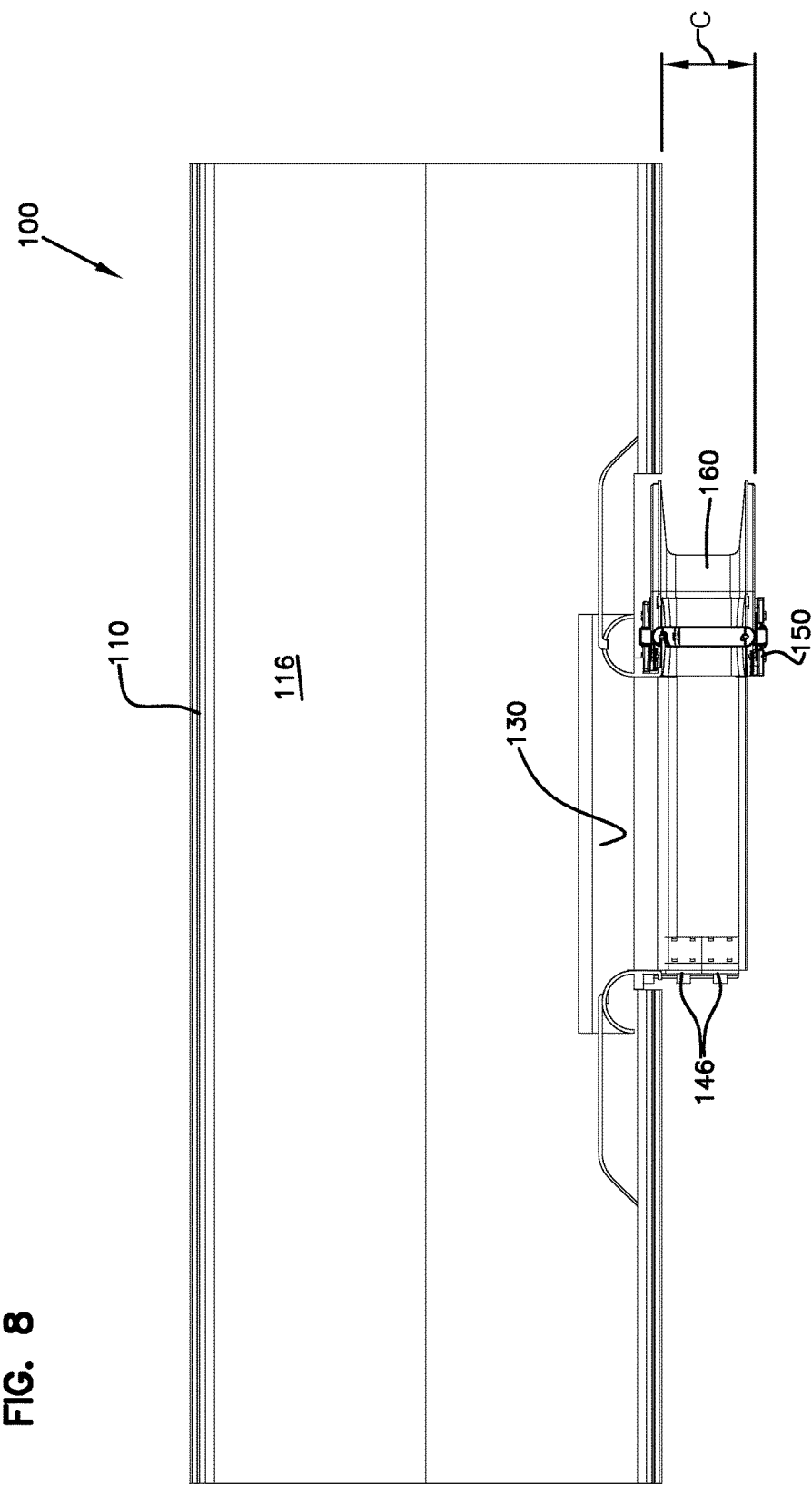
FIG. 8 is top view of the cable routing system of FIG. 7.

Referring now to FIGS. 7-8, another example of the system 100 is shown with the exit structure 102 in a third position. In this example, the exit structure 102 is configured in a same manner as that described above, except that the exit structure 102 is generally flush with the sidewall 114. In this configuration, only the opening 118 formed in the sidewall 114 is necessary. The plate 140 extends perpendicularly from the lateral trough 110. The exit structure extends from the lateral trough 110 a distance C. In this example, the distance C is 4 inches. To accomplish this configuration, two sidewall members 146 are used. Further, a 4 inch coupler and downspout can be used.

Figure 9:
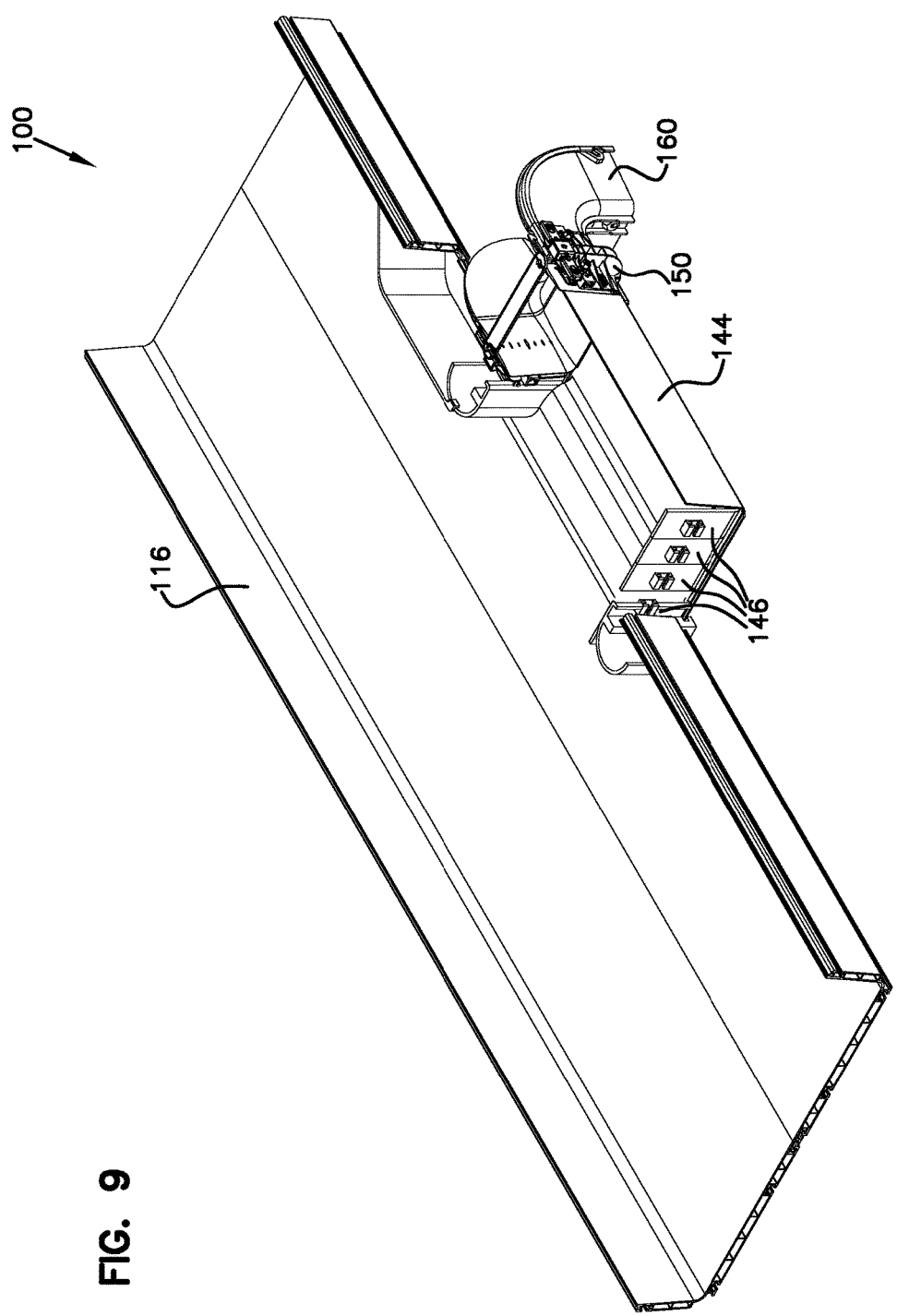
FIG. 9 is a perspective view of a fourth embodiment of the cable routing system of FIG. 1.
Figure 10:
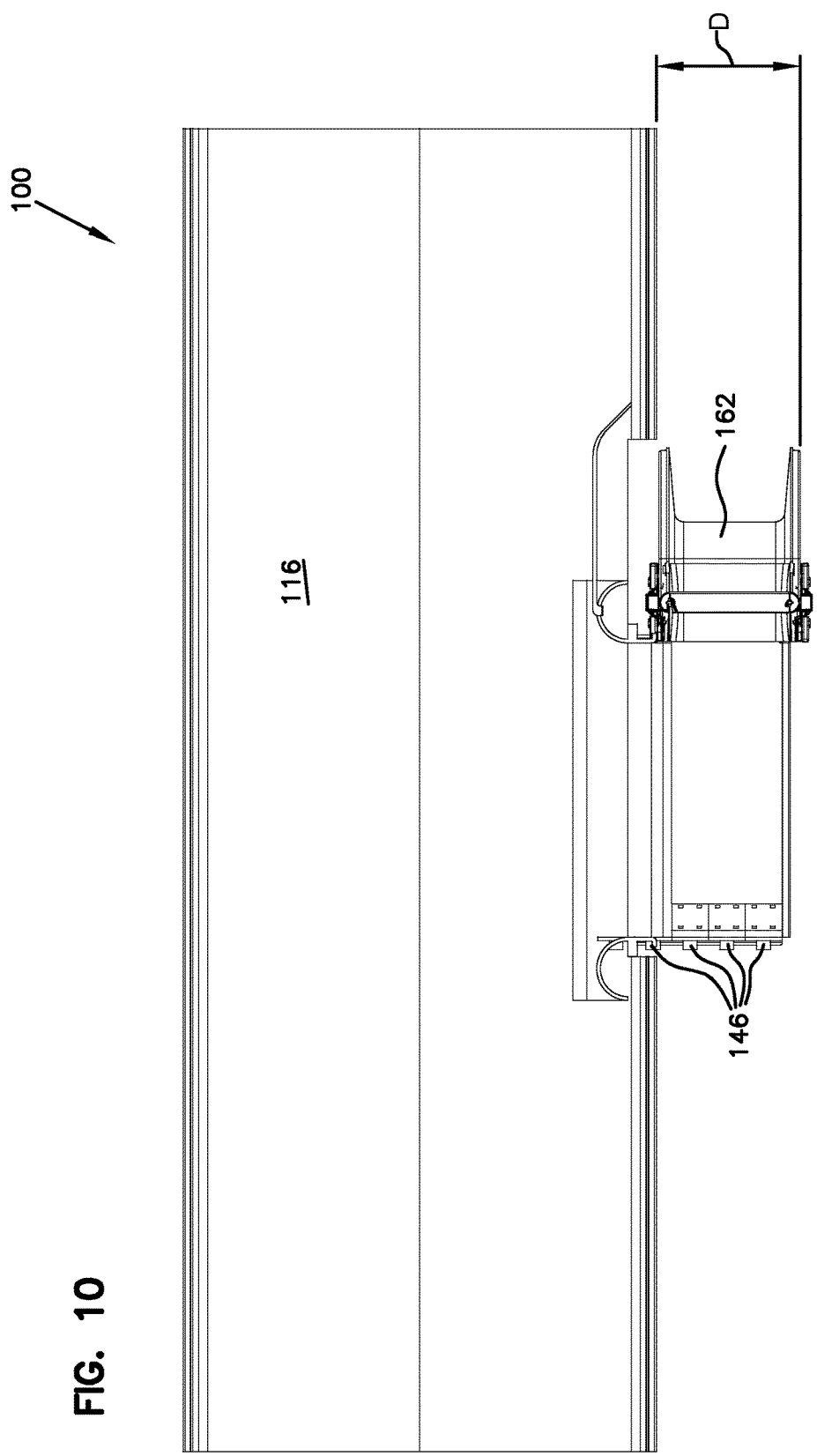
FIG. 10 is top view of the cable routing system of FIG. 9.

Referring now to FIGS. 9-10, another example of the system 100 is shown with the exit structure 102 in a fourth position. In this example, the exit structure 102 is configured in a same manner as that described above, and the exit structure 102 is generally flush with the sidewall 114. In this configuration, only the opening 118 formed in the sidewall 114 is necessary. The plate 140 extends perpendicularly from the lateral trough 110. The exit structure extends from the lateral trough 110 a distance D, which is greater than the distance C. In this example, the distance D is 6 inches. To accomplish this configuration, four sidewall members 146 are used. Further, a 6 inch coupler and downspout can be used.

Figure 11:
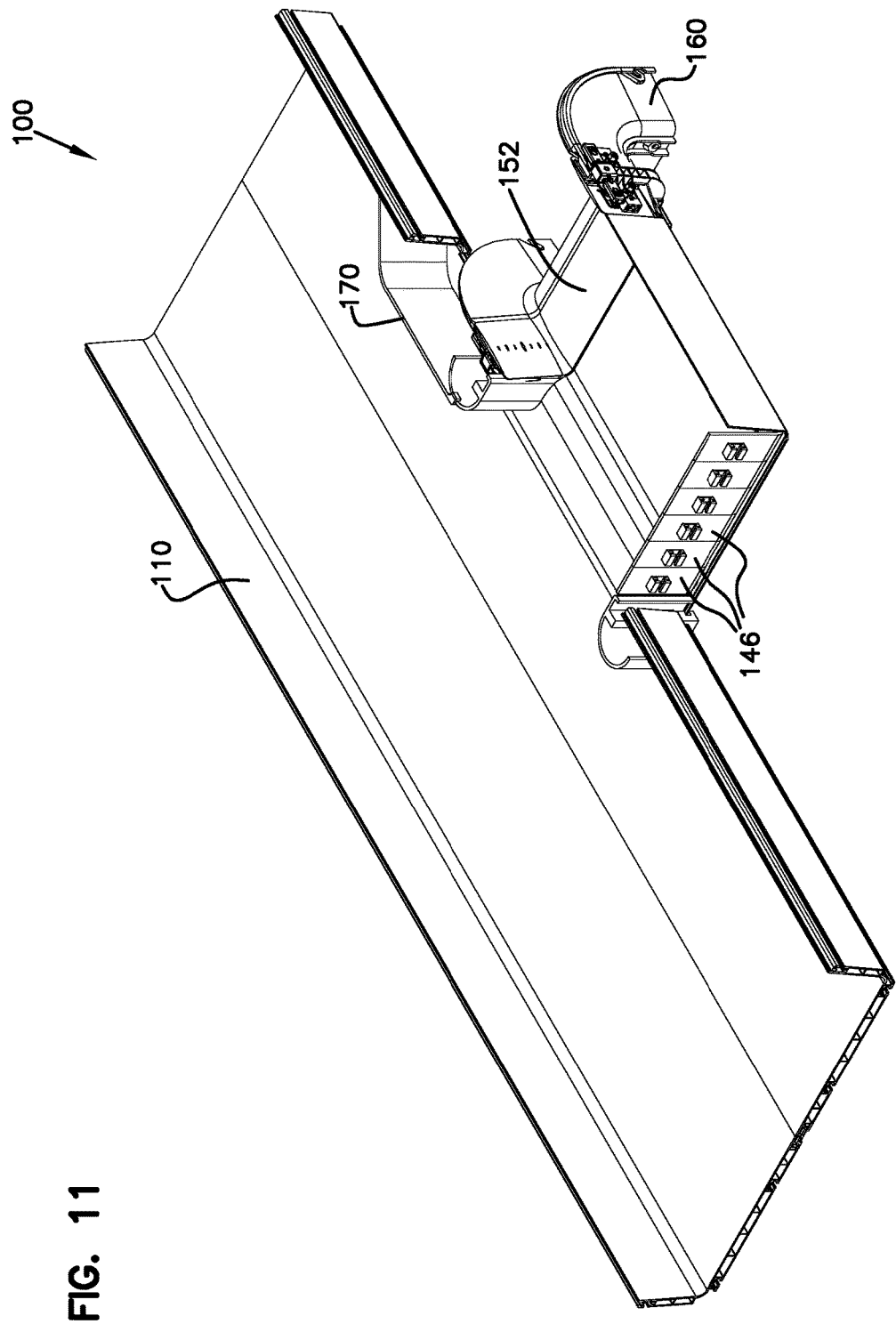
FIG. 11 is a perspective view of a fifth embodiment of the cable routing system of FIG. 1.
Figure 12:
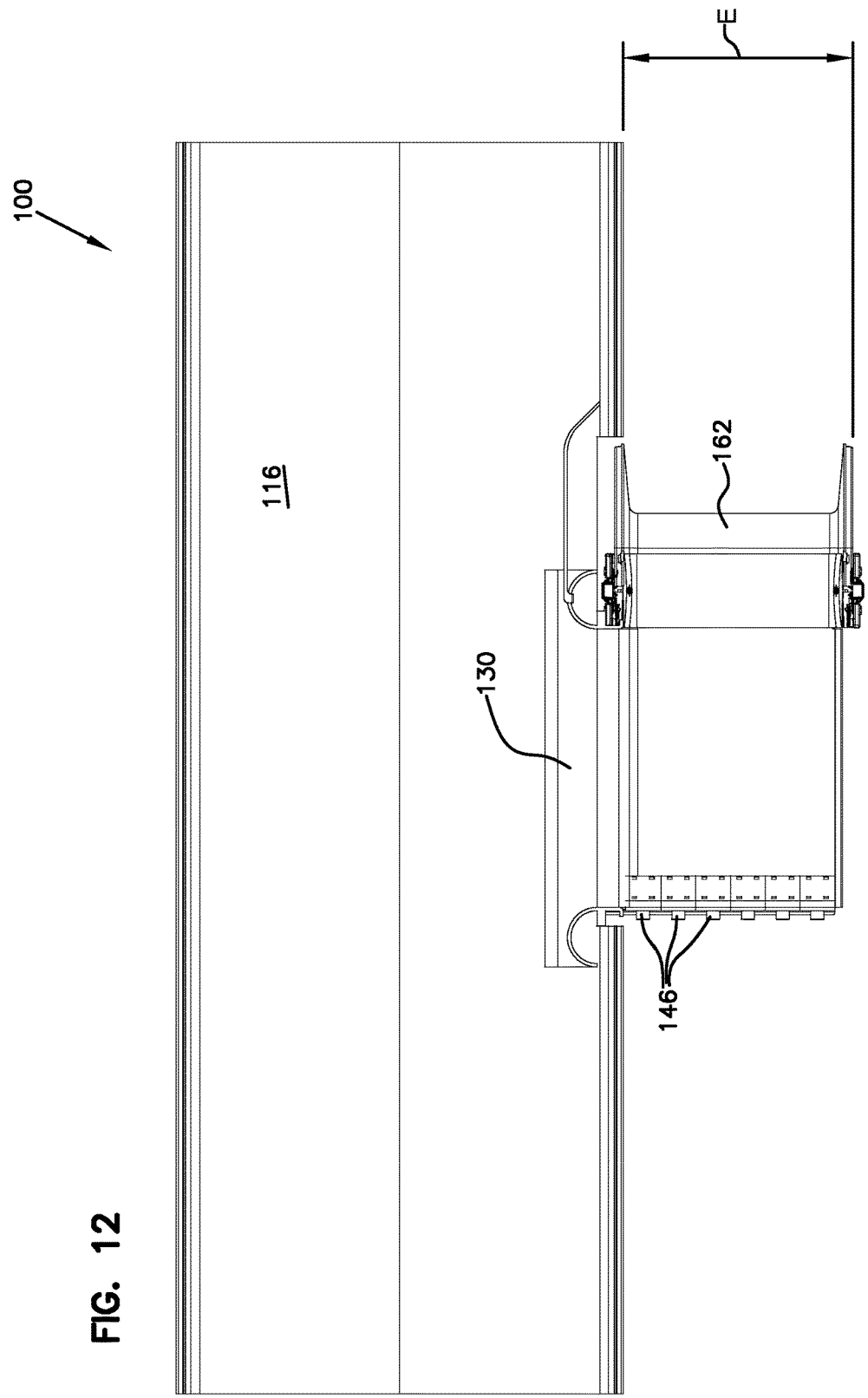
FIG. 12 is top view of the cable routing system of FIG. 11.

Referring now to FIGS. 11-12, another example of the system 100 is shown with the exit structure 102 in a fifth position. In this example, the exit structure 102 is configured in a same manner as that described above, and the exit structure 102 is generally flush with the sidewall 114. In this configuration, only the opening 118 formed in the sidewall 114 is necessary. The plate 140 extends perpendicularly from the lateral trough 110. The exit structure extends from the lateral trough 110 a distance E, which is greater than the distance D. In this example, the distance E is 12 inches. To accomplish this configuration, six sidewall members 146 are used. Further, a 12 inch coupler and downspout can be used.

Figure 13:
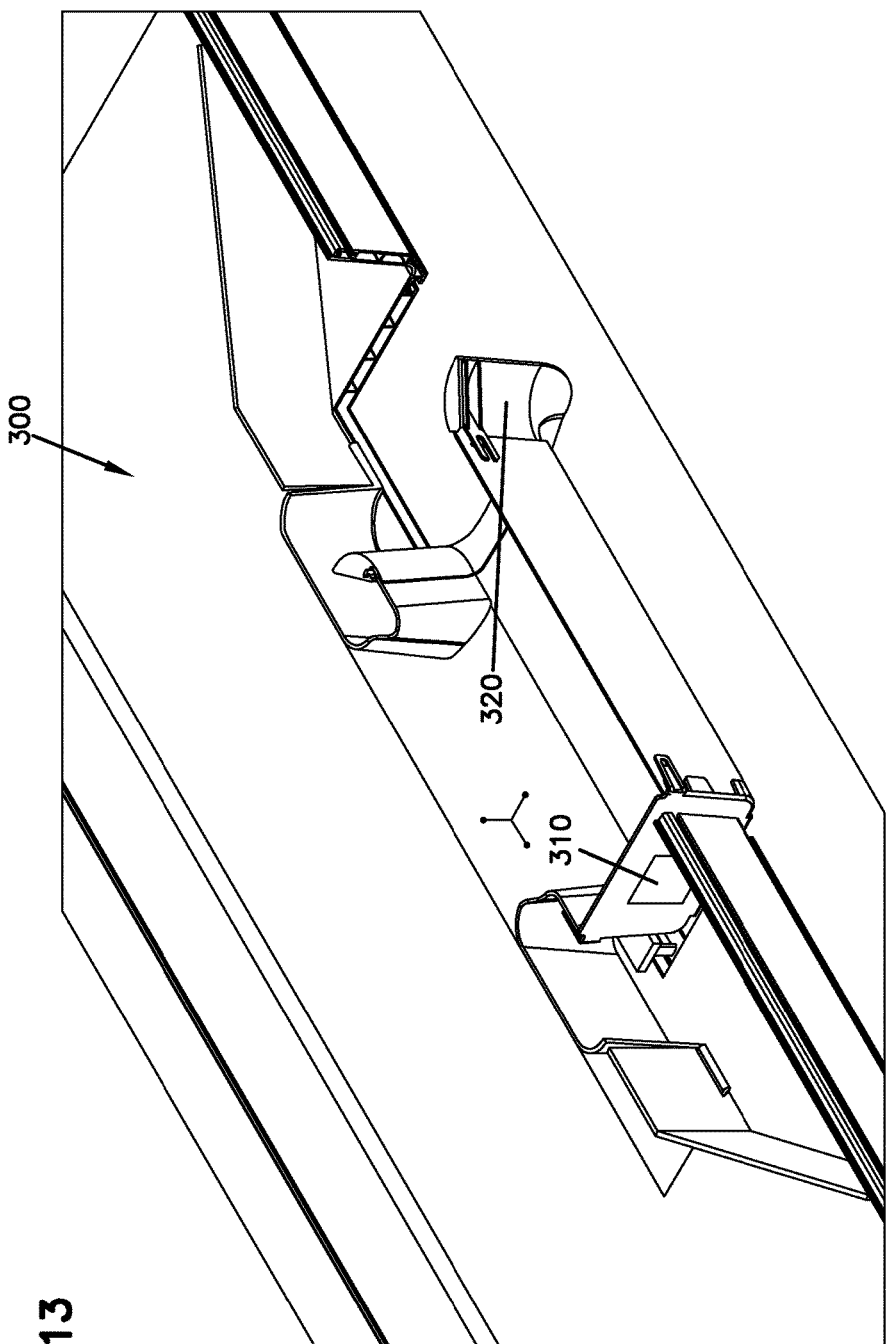
FIG. 13 is a perspective view of a second embodiment of the cable routing system.
Figure 14A:
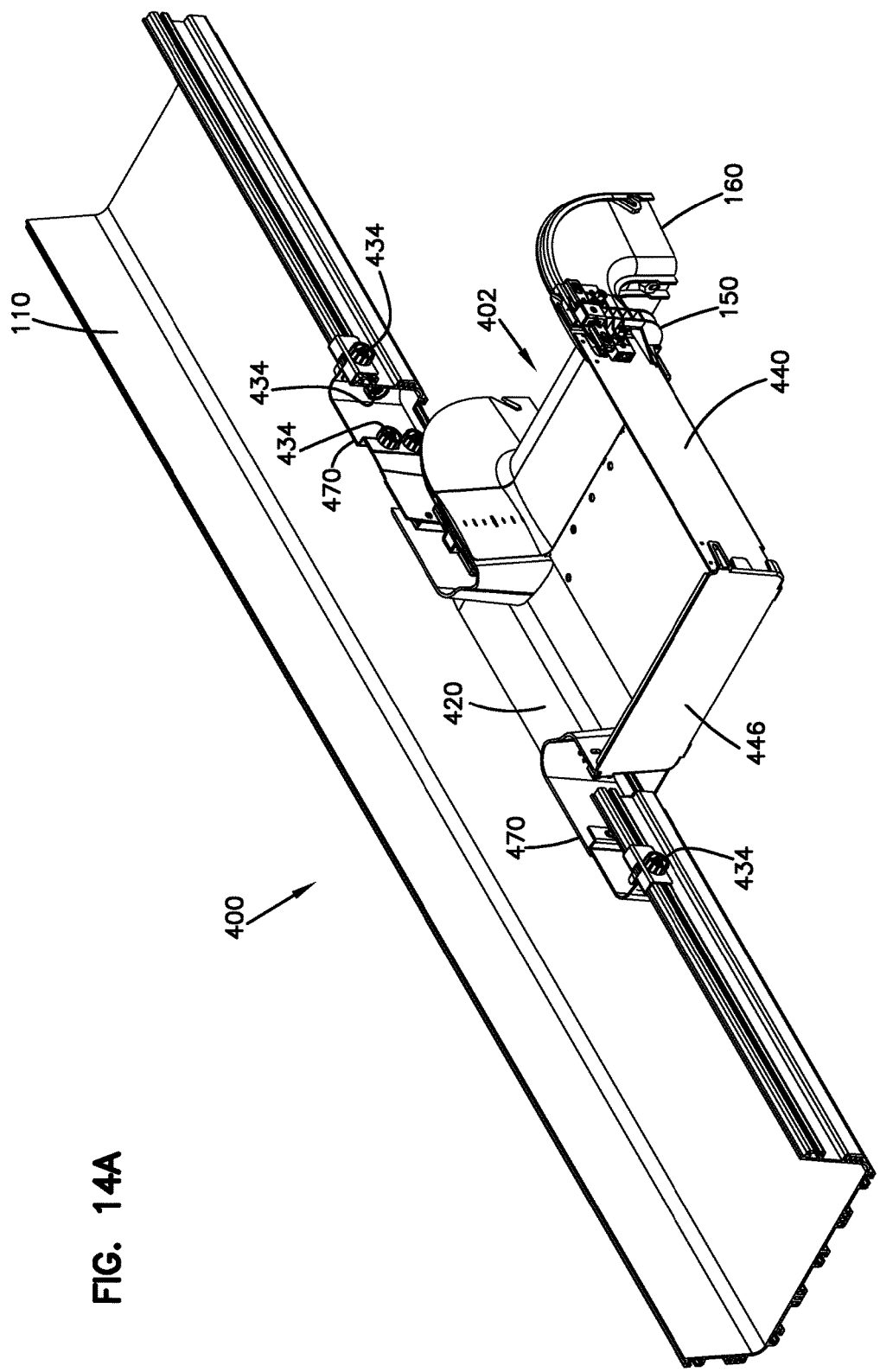
FIGS. 14A-D are various views of a sixth embodiment of a cable routing system of FIG. 1.
Figure 14B:
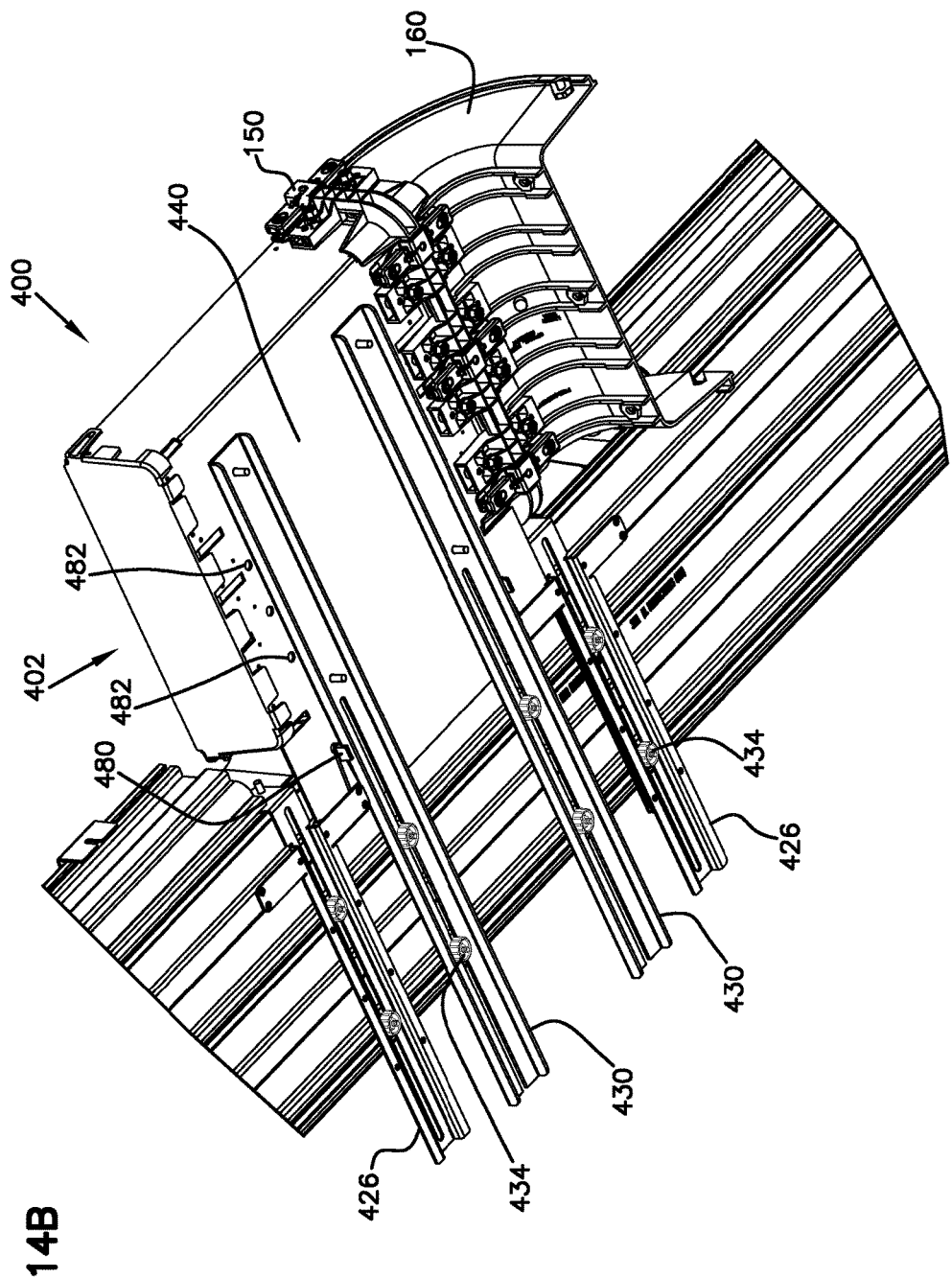
Figure 14C:
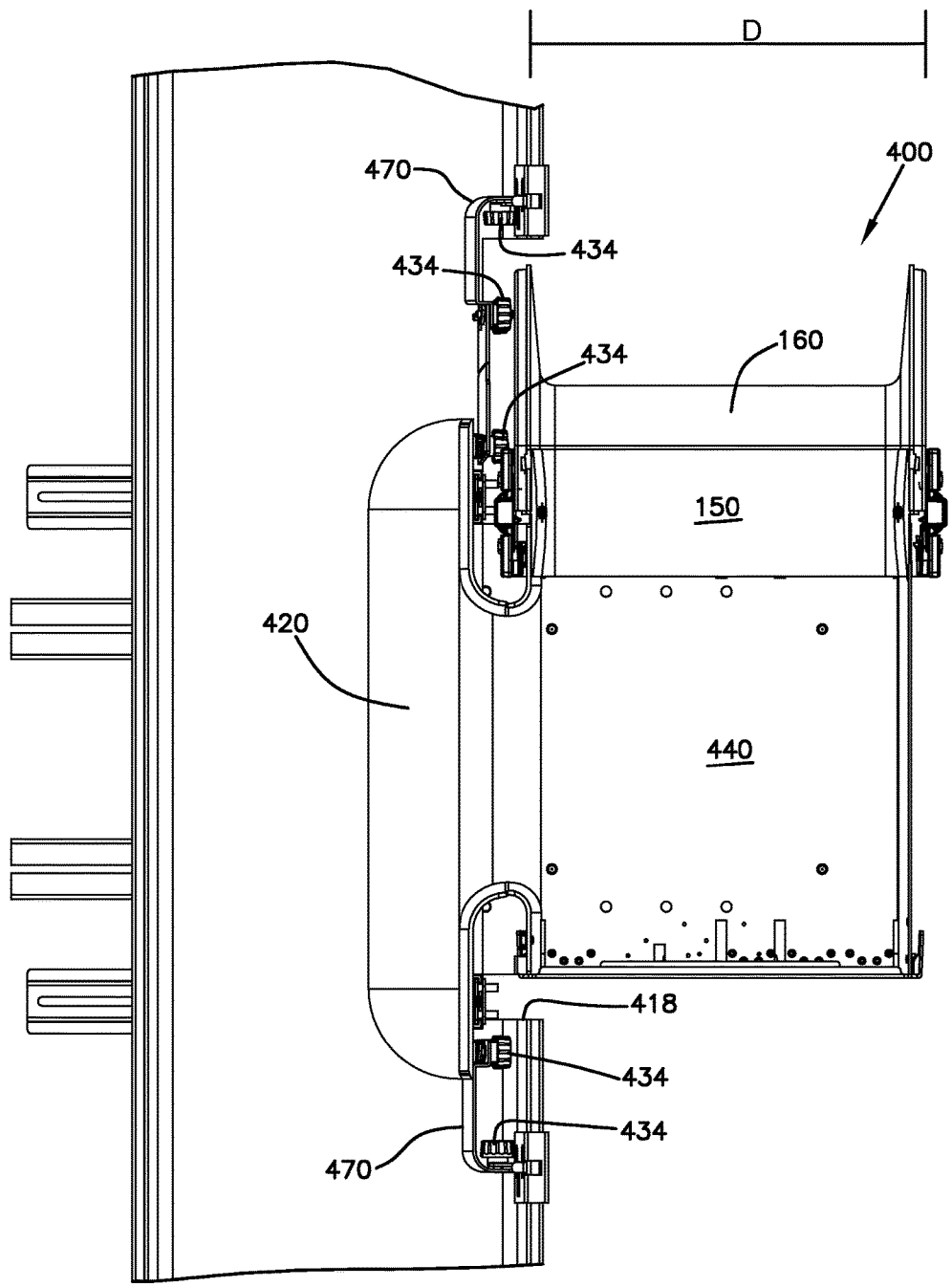
Figure 14D:
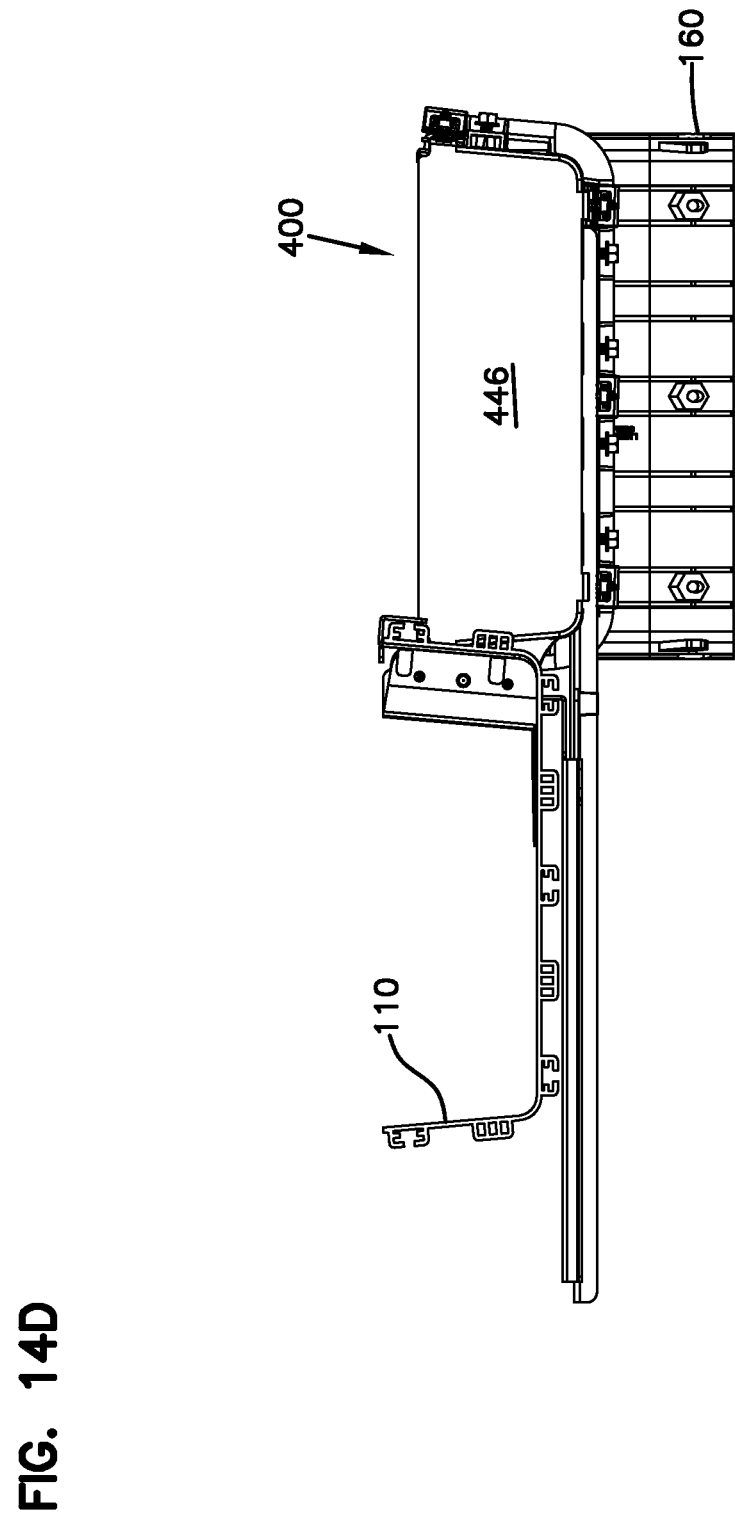

Referring now to FIG. 13, another example cable routing system 300 is shown. The system 300 is similar to the system 100 described above, with the following exceptions. The system 300 includes a single sidewall member 310 (instead of multiple sidewall members 146). The single sidewall member 310 is sized to close the opening opposite to that of the exit. For different implementations, sidewall members 310 having different lengths can be provided.

Also, the system 300 includes another example of an exit component, a trumpet 320 (rather than the downspout 160). In other configurations, other exit components can be used.

Other configurations are possible. For example, the exit structure can be configured to extend into and out of the lateral trough at different distances. In example embodiments, the exit structure is configured so that the downspout is positioned generally above the telecommunications equipment. By moving the exit structure perpendicularly relative to the lateral trough, the desired position for the downspout can be obtained so that the optical cables are positioned as desired.

This allows for configurability during installation of the exit structure. Further, if the topography of the equipment changes, the exit structure can be moved or readjusted. For example, the plate can be moved inward or outward relative to the lateral trough to change the position at which the fiber optic cables exit the exit structure.

In other designs, the exit structure can be used with other cable routing components, such as cross components and T's.

Further, in an alternative design, one or more of the fitting, plate, coupler and/or downspout can be formed as an integral unit. For example, the exit structure can be formed as one or more pieces, and different exit structures of different sizes can be provided as needed.

Referring now to FIGS. 14-21, another example of the system 400 is shown with an exit structure 402. In this example, the exit structure 402 includes a fitting 420 configured to be placed in the opening 418 in the lateral trough 110. The fitting 420 defines an exit region from the lateral trough 110 and is mounted to the lateral trough 110 with brackets 426. Fitting 420 is also positioned adjacent to brackets 470 which facilitate cable routing to fitting 420.

Figure 21:
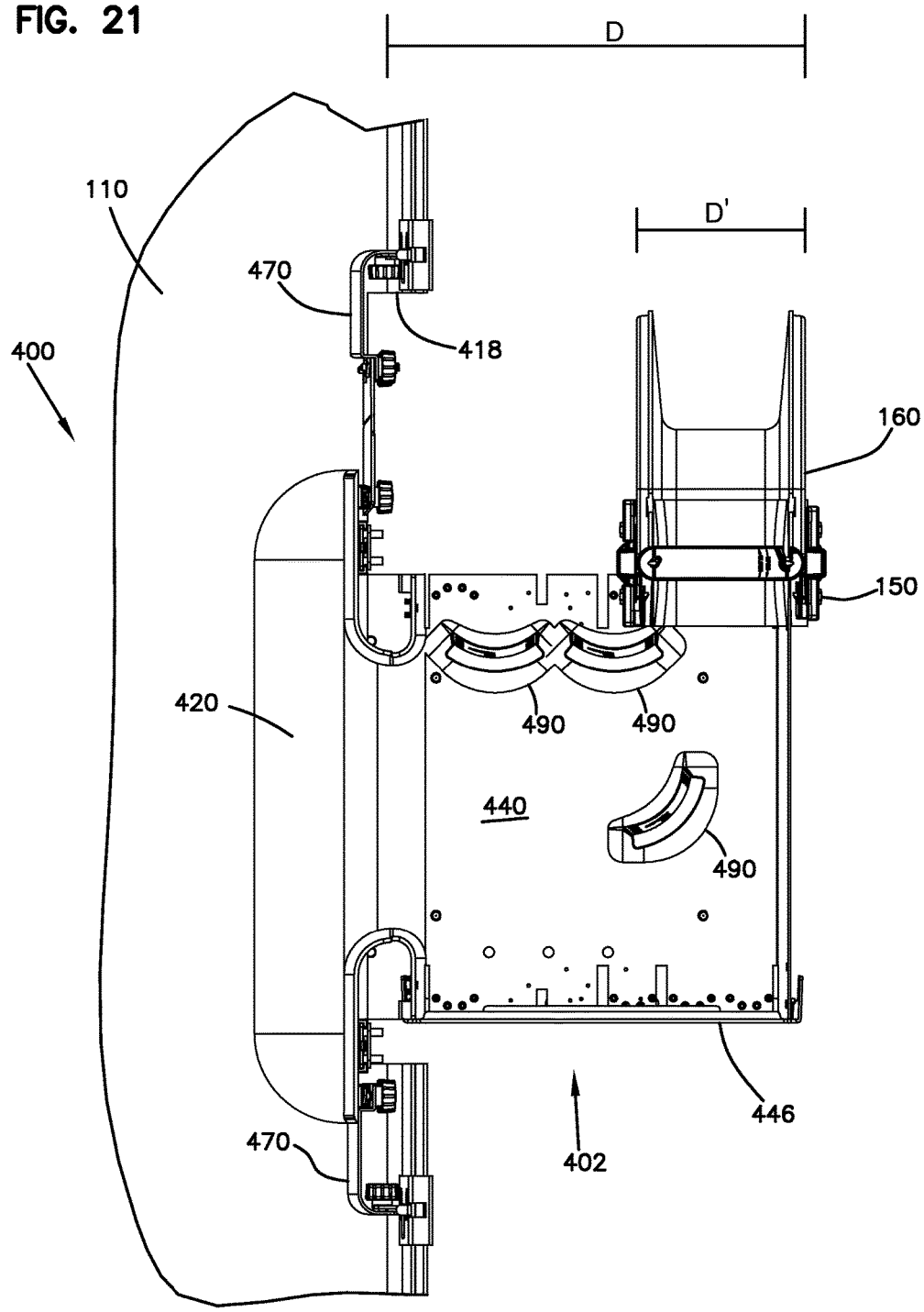
FIG. 21 is a top view of an eleventh embodiment of the cable routing system of FIG. 1.

Support brackets 430 hold a plate 440 that extends perpendicularly from the lateral trough 110. The support brackets 430 are coupled to the lateral trough 110 using connectors 434 or additional supporting structures. The plate 440 slides with the support brackets 430 in the perpendicular direction until a desired distance D is reached. Opening 418 can be cut as desired, flush (sidewall only removed), 4 inches, 6 inches, 8 inches, 10 inches or 12 inches. Divider walls 490 can be added as desired, as shown in FIGS. 20 and 21. See U.S. Pat. No. 6,708,918, the disclosure of which is hereby incorporated by reference. Plate 440 with support brackets 430 slides relative to fitting 420 held in place by brackets 426. A latch 480 on each bracket 426 engages holes 482 on plate 440 to help hold plate 440 in position during assembly or adjustment.

Plate 440 leads to a downspout 160 or a trumpet 460. An opposite side can include a sidewall portion 446, or another downspout 160 or trumpet 460.

Figure 22:
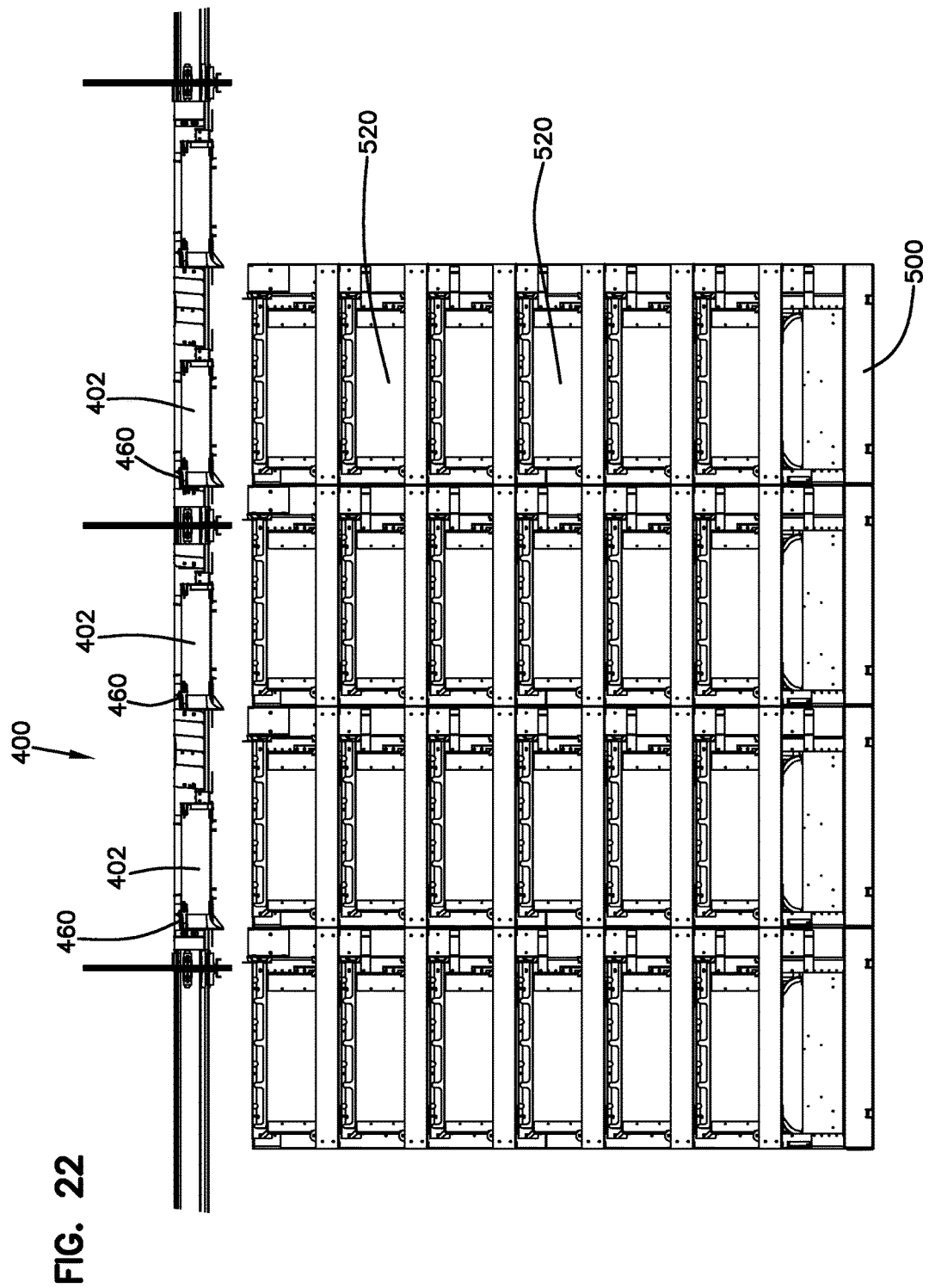
FIG. 22 shows an example cable routing system positioned over telecommunications equipment.
Figure 23:
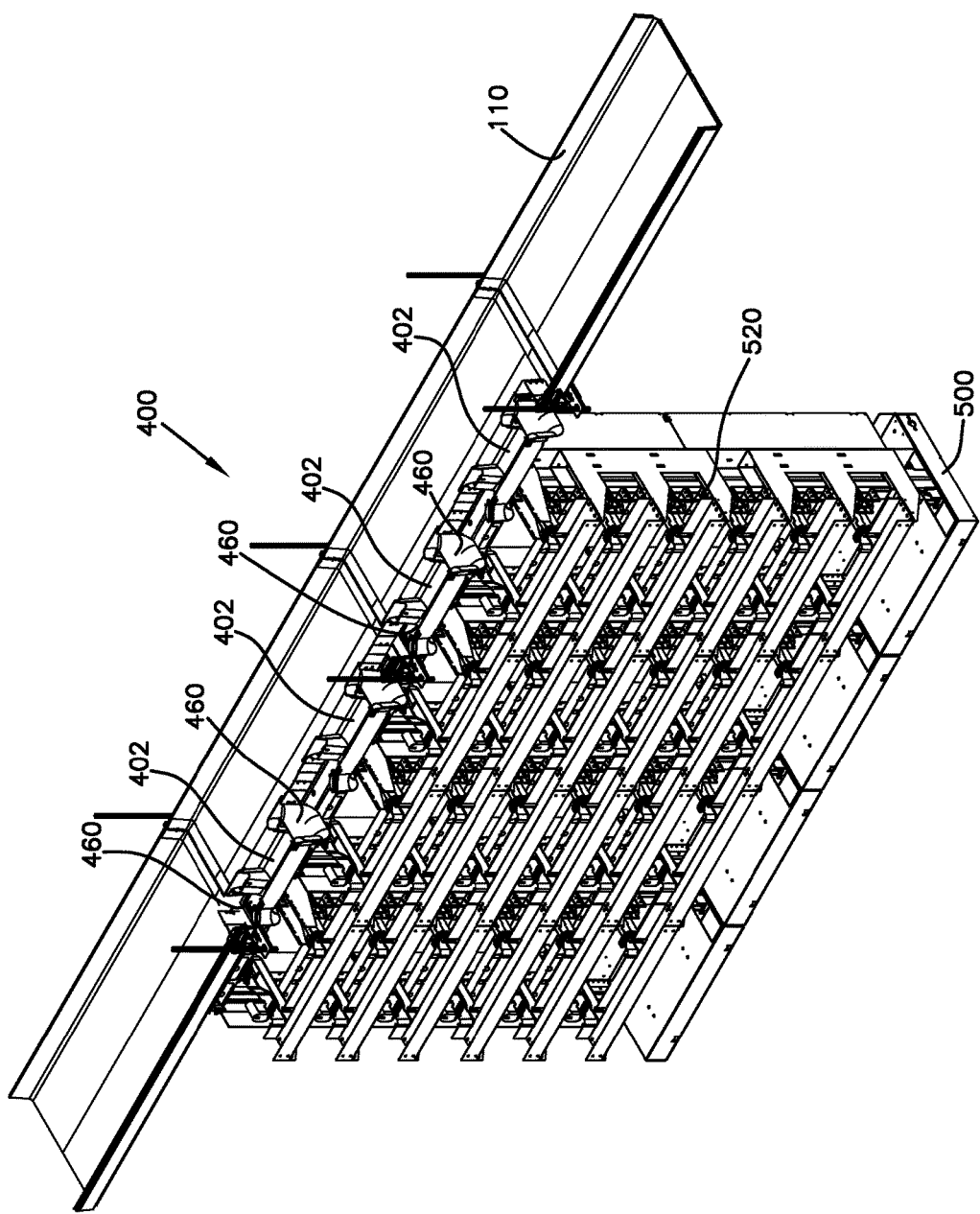
FIG. 23 is another view of the cable routing system positioned over telecommunications equipment.

Referring now to FIGS. 22 and 23, the system 400 is shown in greater detail. In this system, the lateral trough 110 is mounted above a rack arrangement 500. Cables within the lateral trough are guided through the exit structure 402 and out through trumpets 460. The cables then go downward to the equipment 520 in the racks below.

Plates 140, 440 are adjustable relative to the lateral trough 110 to define a desired positioning of the cables extending out of the lateral trough to the equipment below. Brackets 170, 470 are also adjustable. Additional variations are possible with the amount of the cutout 118 provided in the lateral trough, as illustrated in the various FIGS. 14-21. As shown in FIGS. 22 and 23, the exit structure 102 and 402 can include only one exit point, or two exit points. Further, the exit structure can include downspouts, trumpets, or other devices.

FIGS. 14A-D show a 12 inch lateral trough 110, and a 12 inch exit structure 402, with a flush opening 418.

Figure 15:
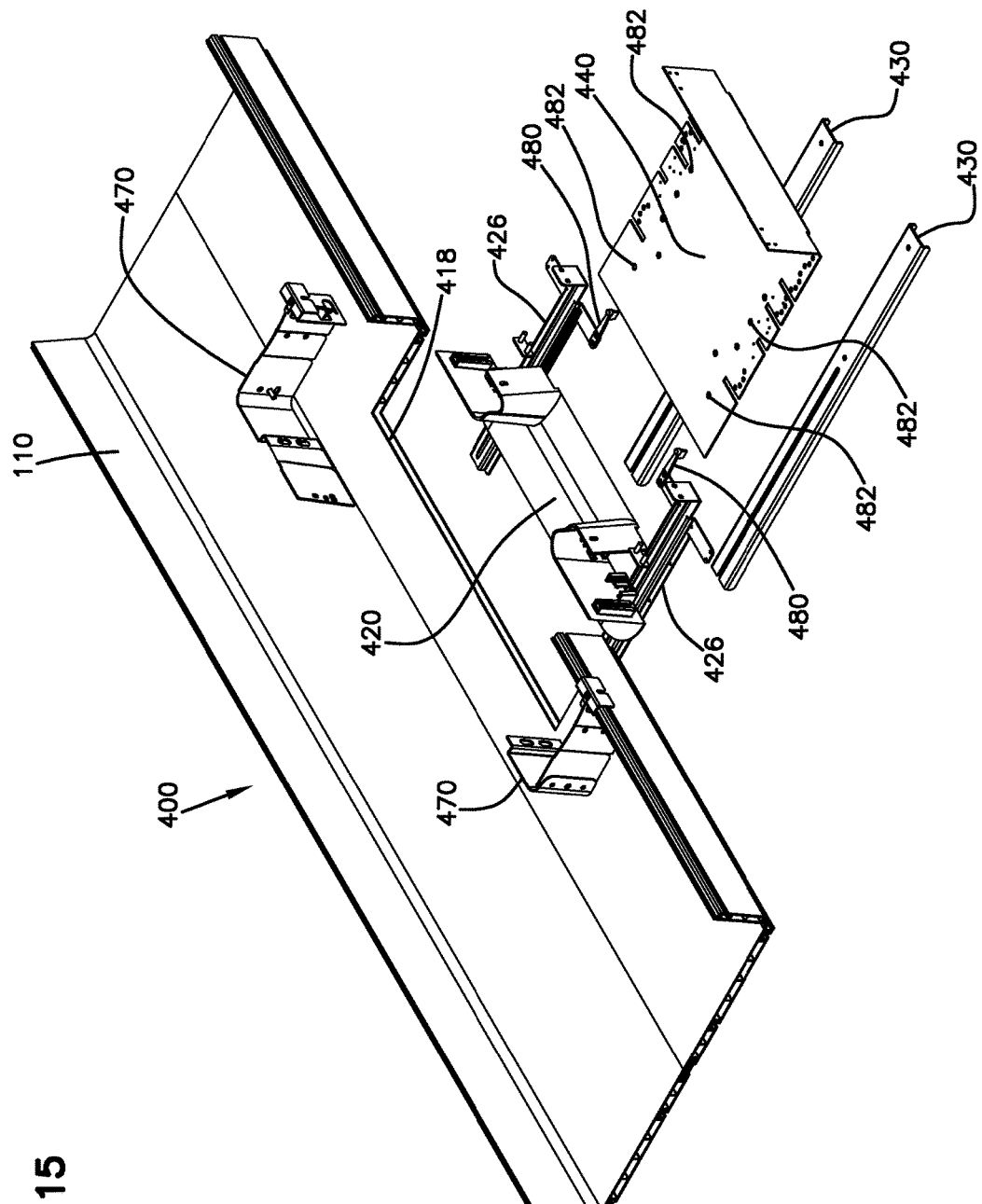
FIG. 15 is an exploded view of the embodiment of FIGS. 14A-D mounted to a different lateral trough.
Figure 16:
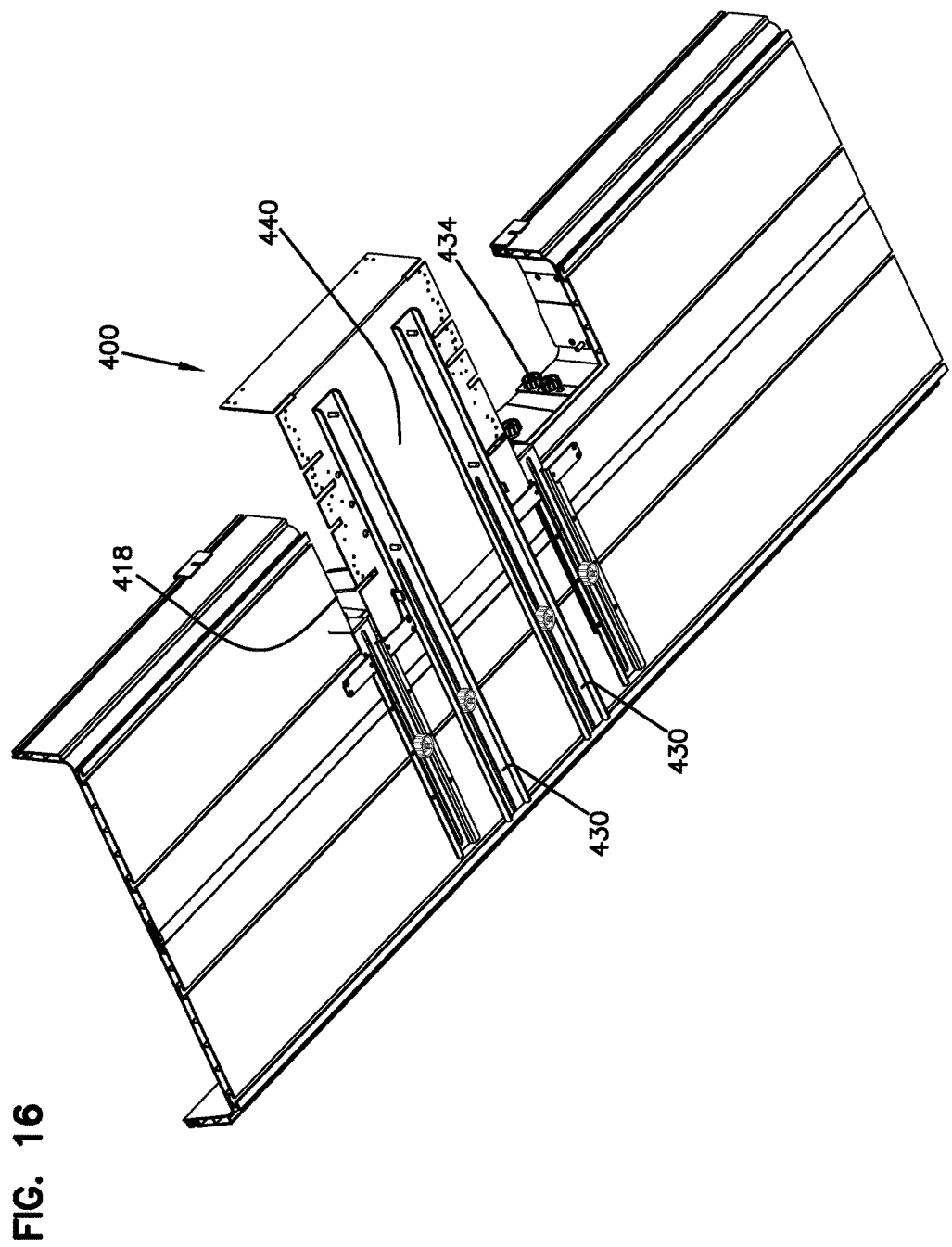
FIG. 16 is a bottom perspective view of the system of FIG. 15.
Figure 17A:
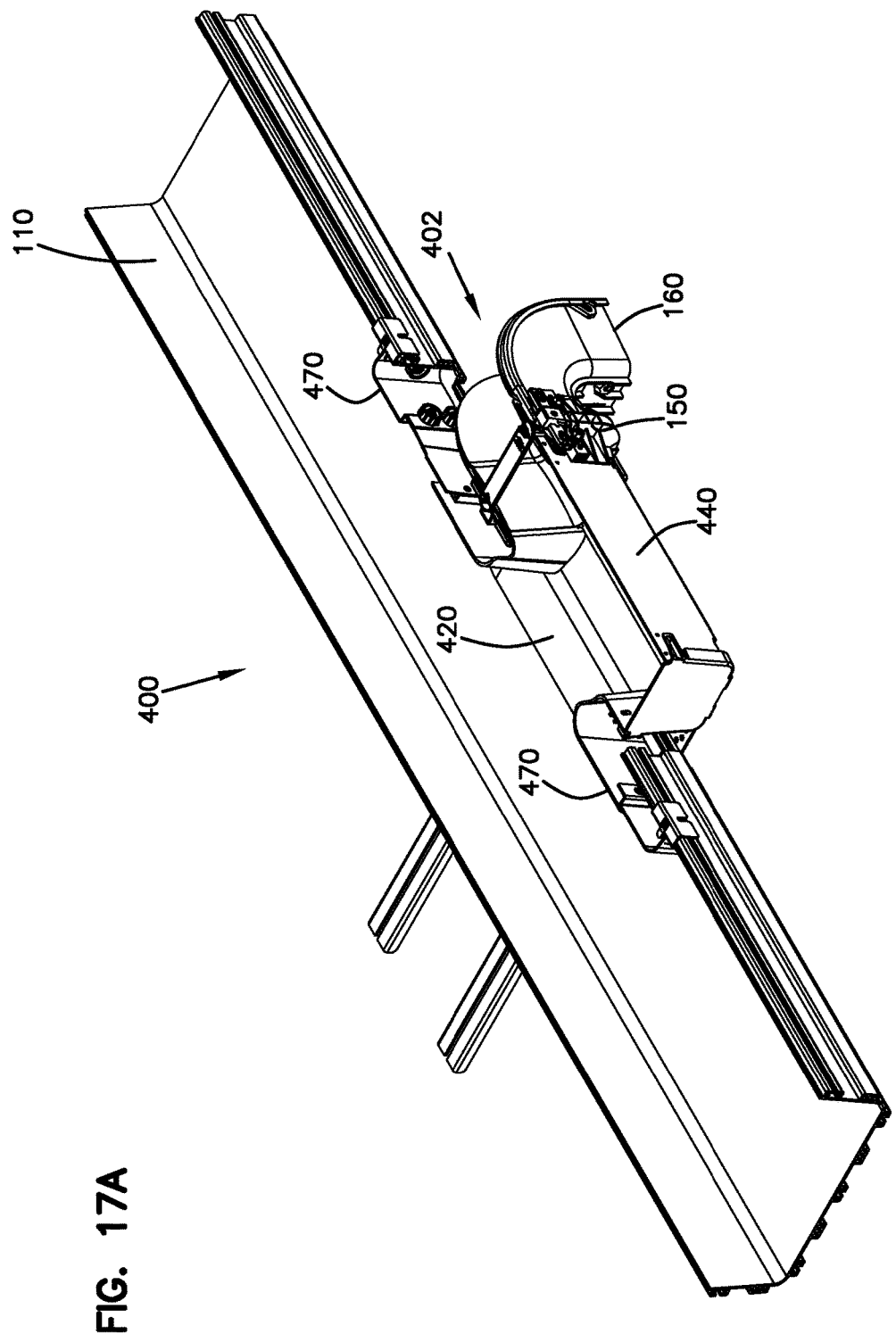
Figure 17B:
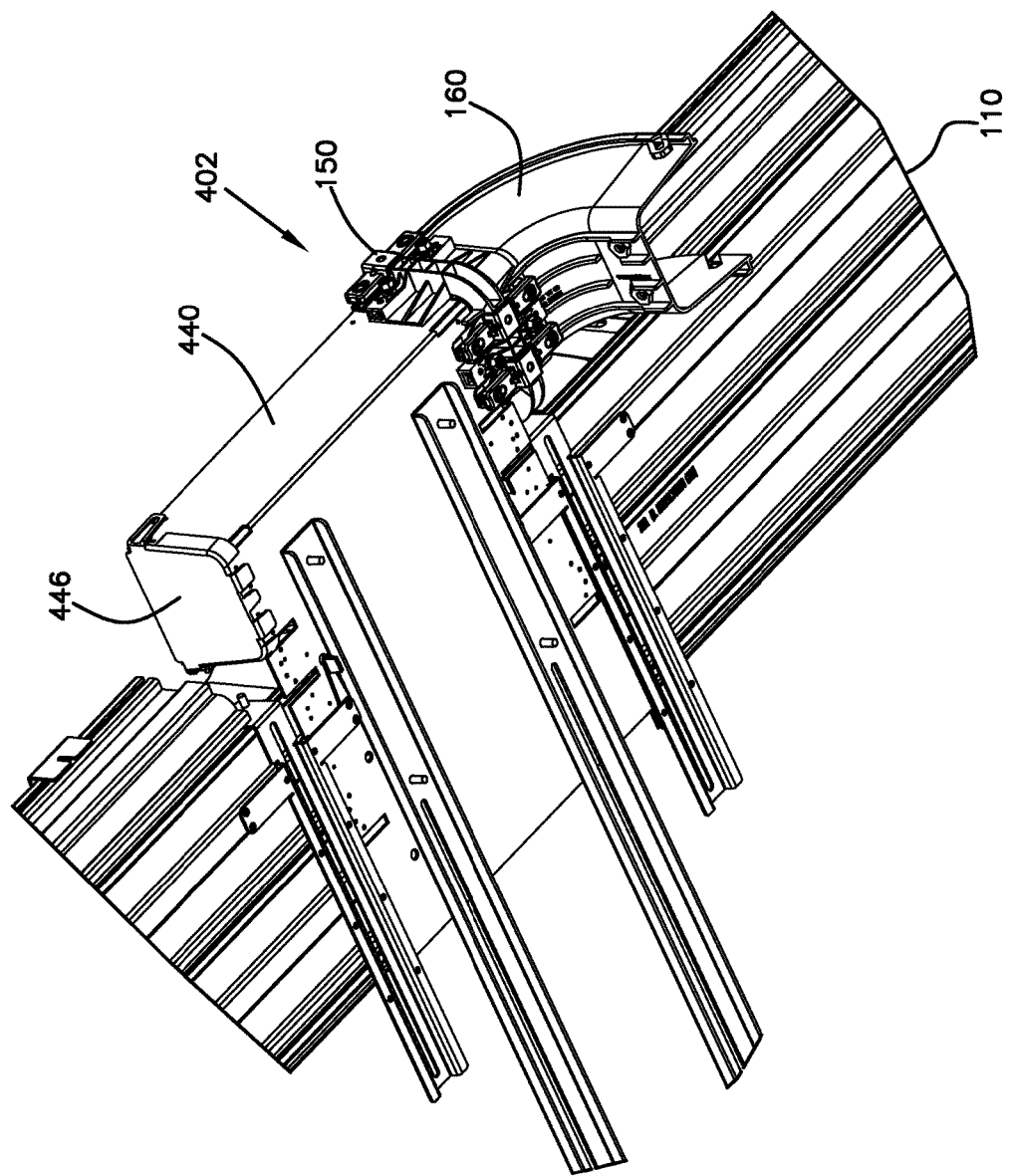
Figure 17D:
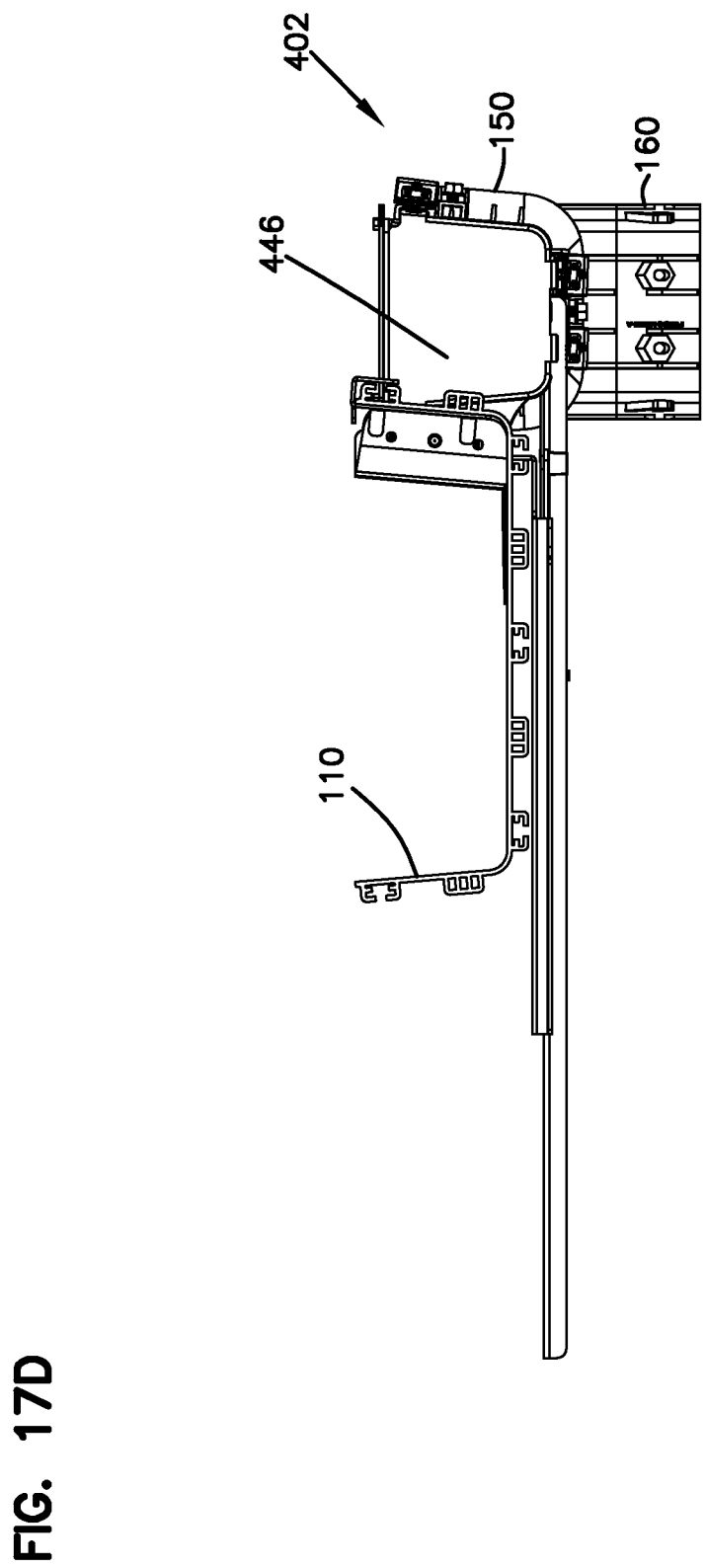
Figure 18A:
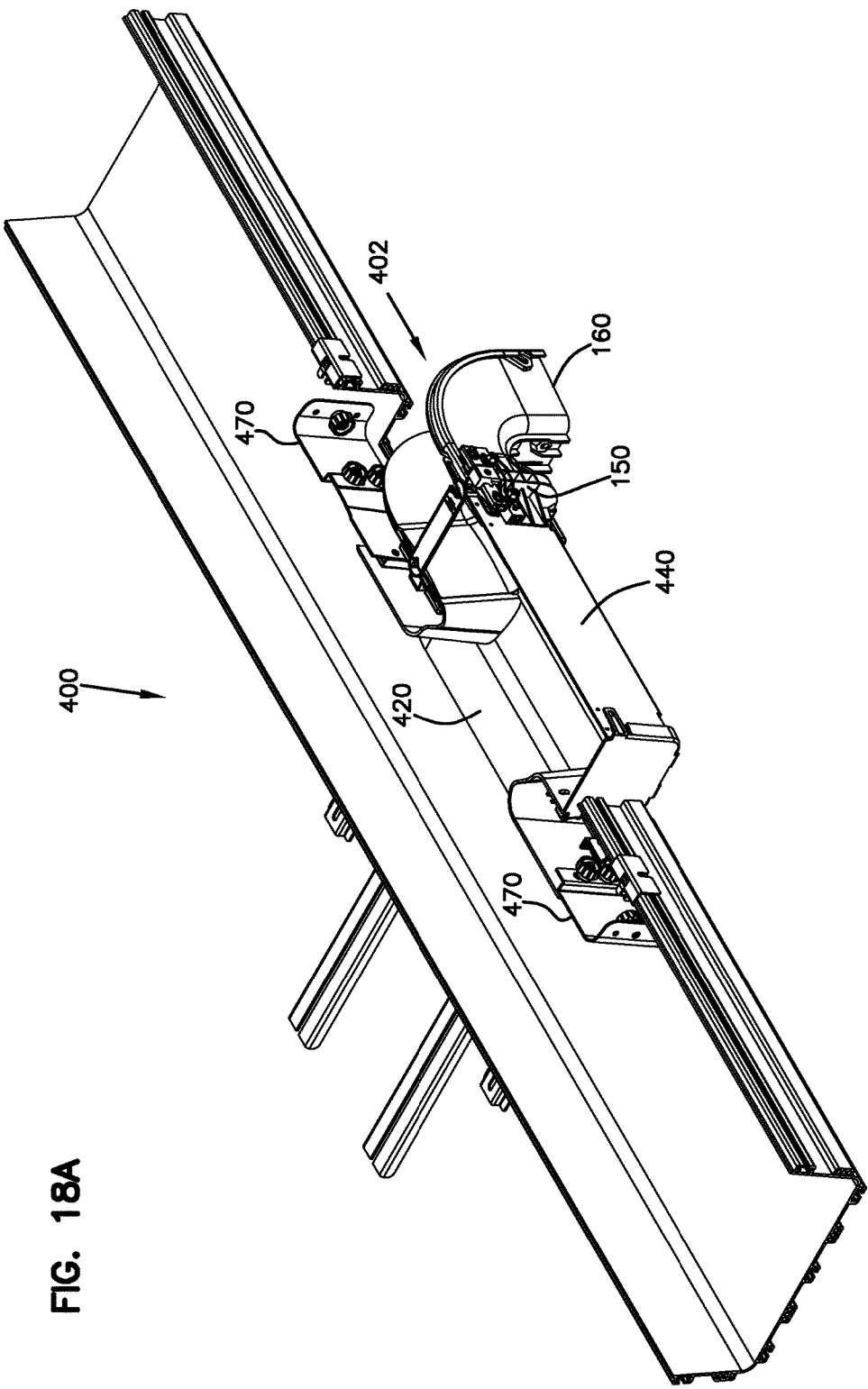
FIGS. 18A-D are various views of an eighth embodiment of the cable routing system of FIG. 1.
Figure 18B:
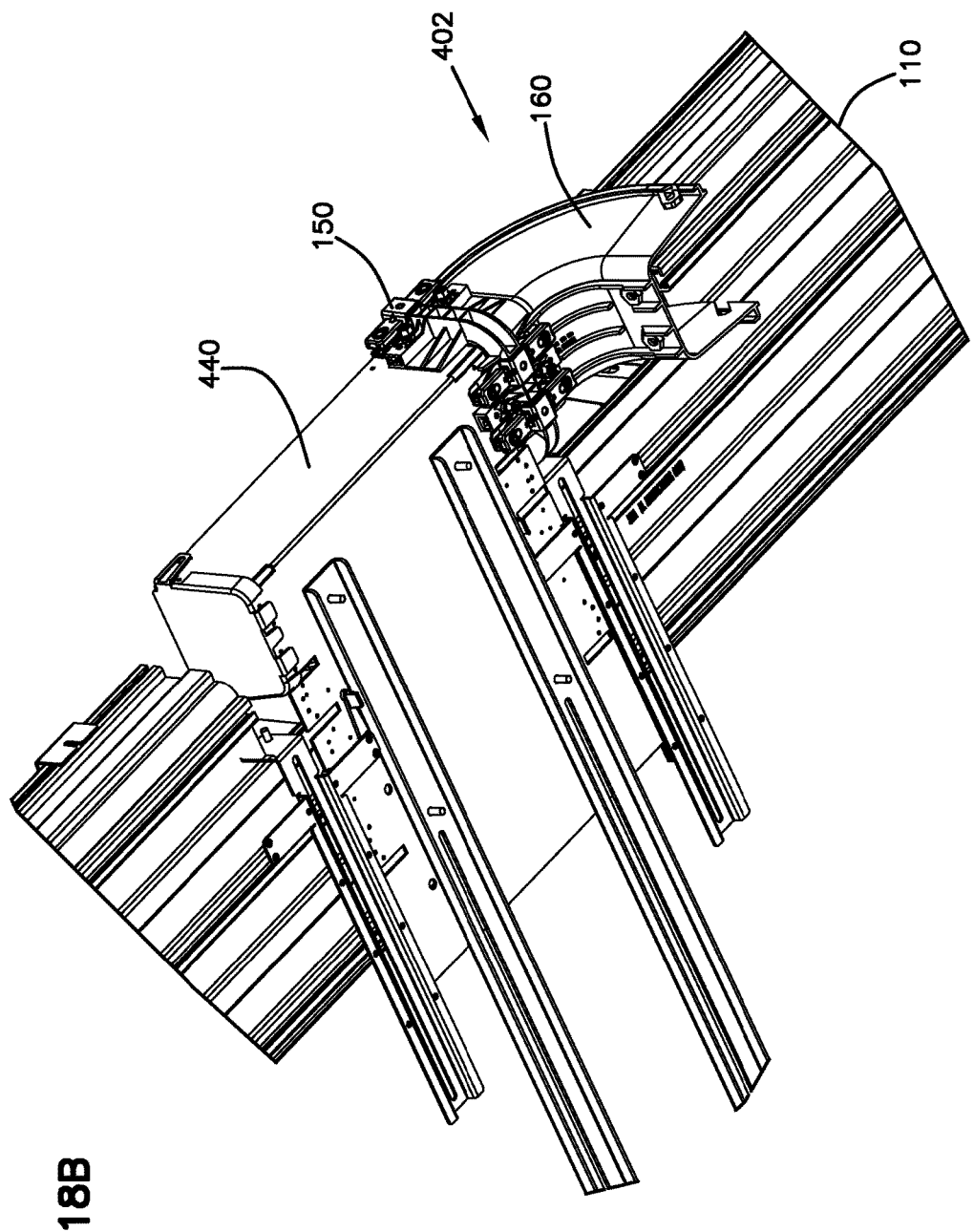
Figure 18C:
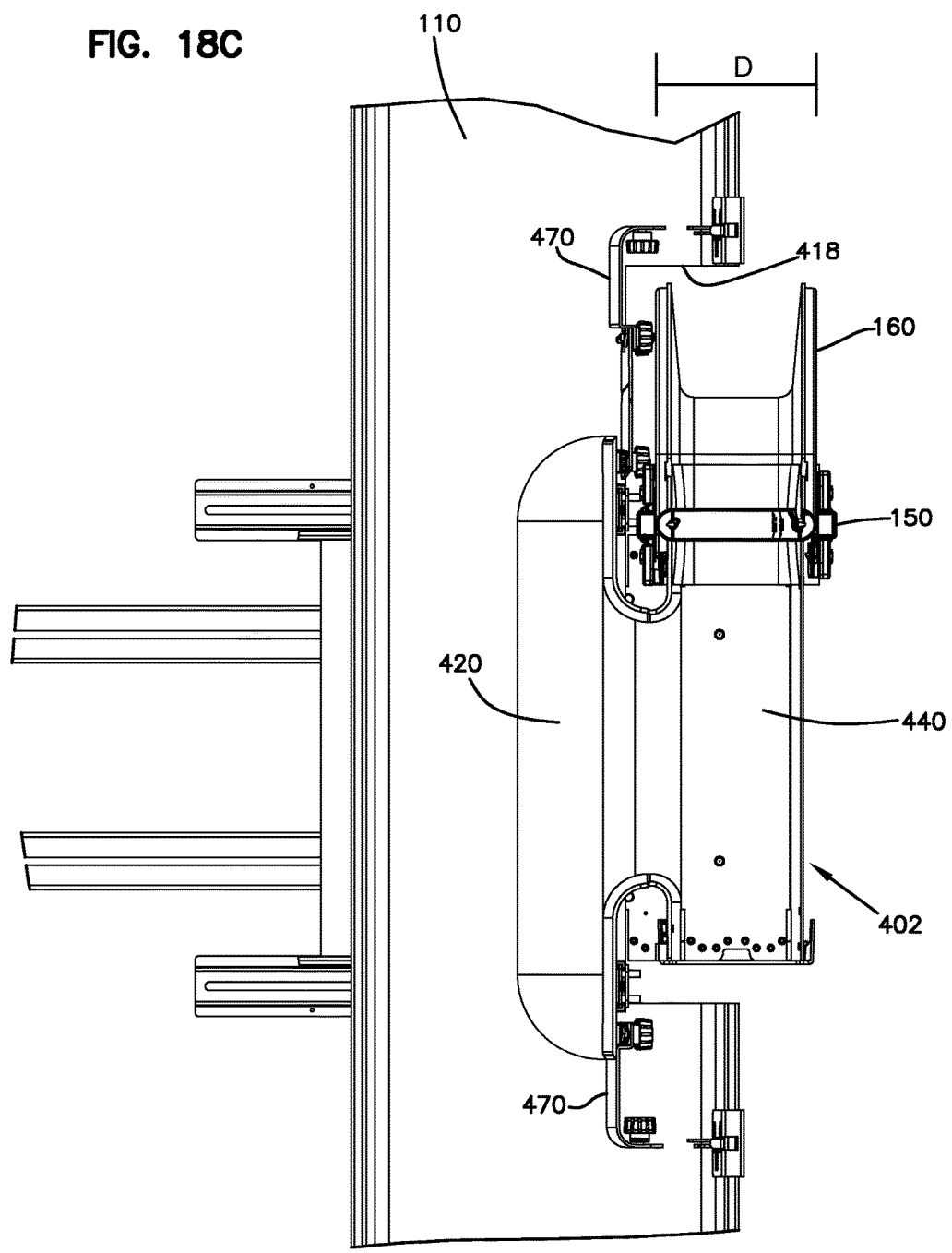
Figure 18D:
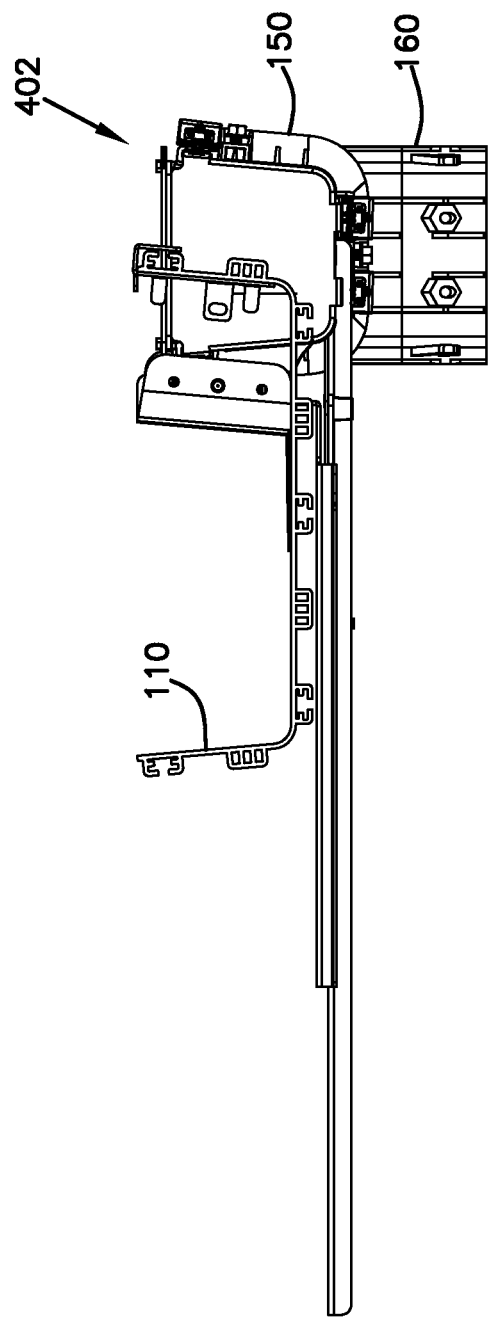
Figure 19A:
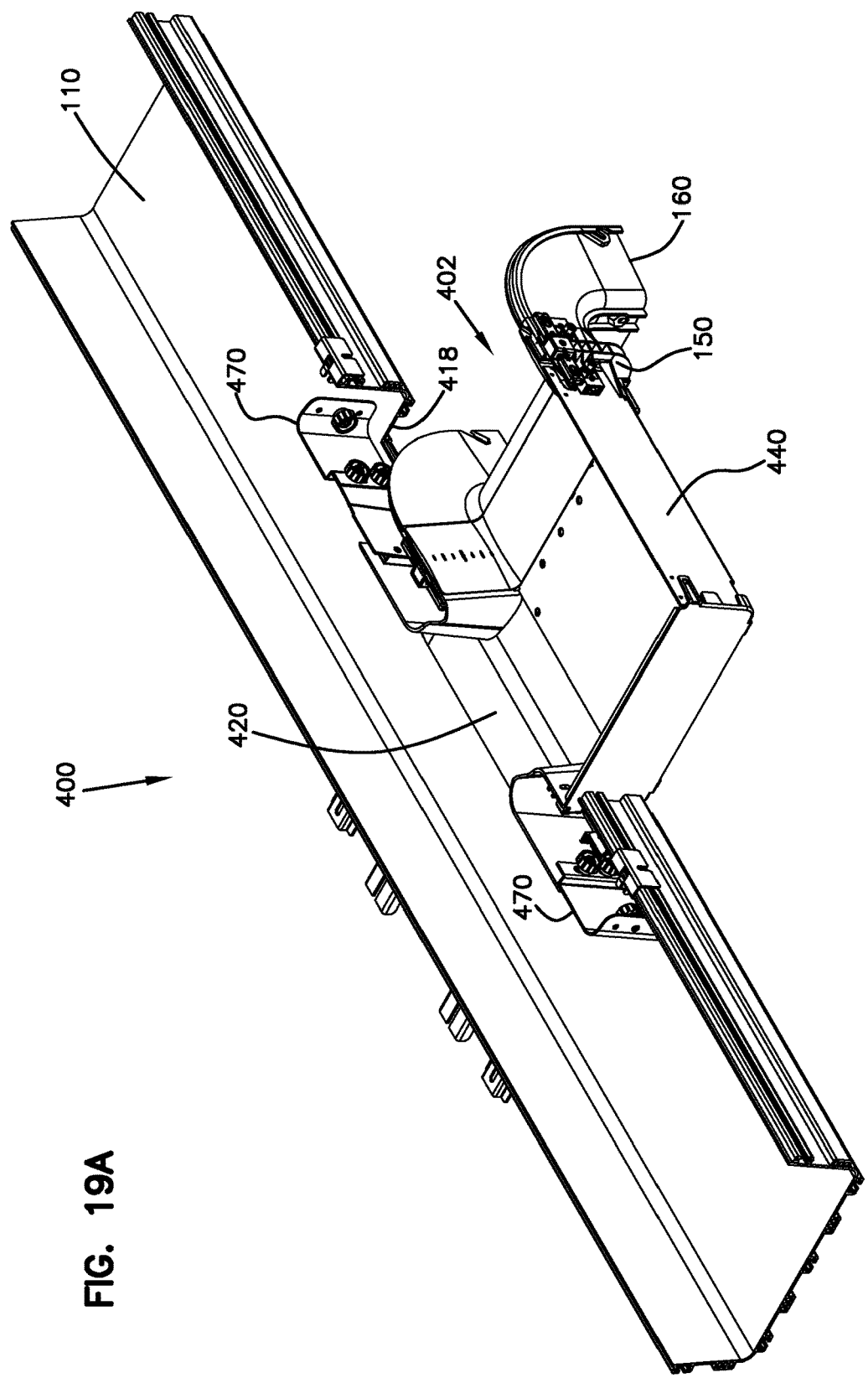
Figure 19B:
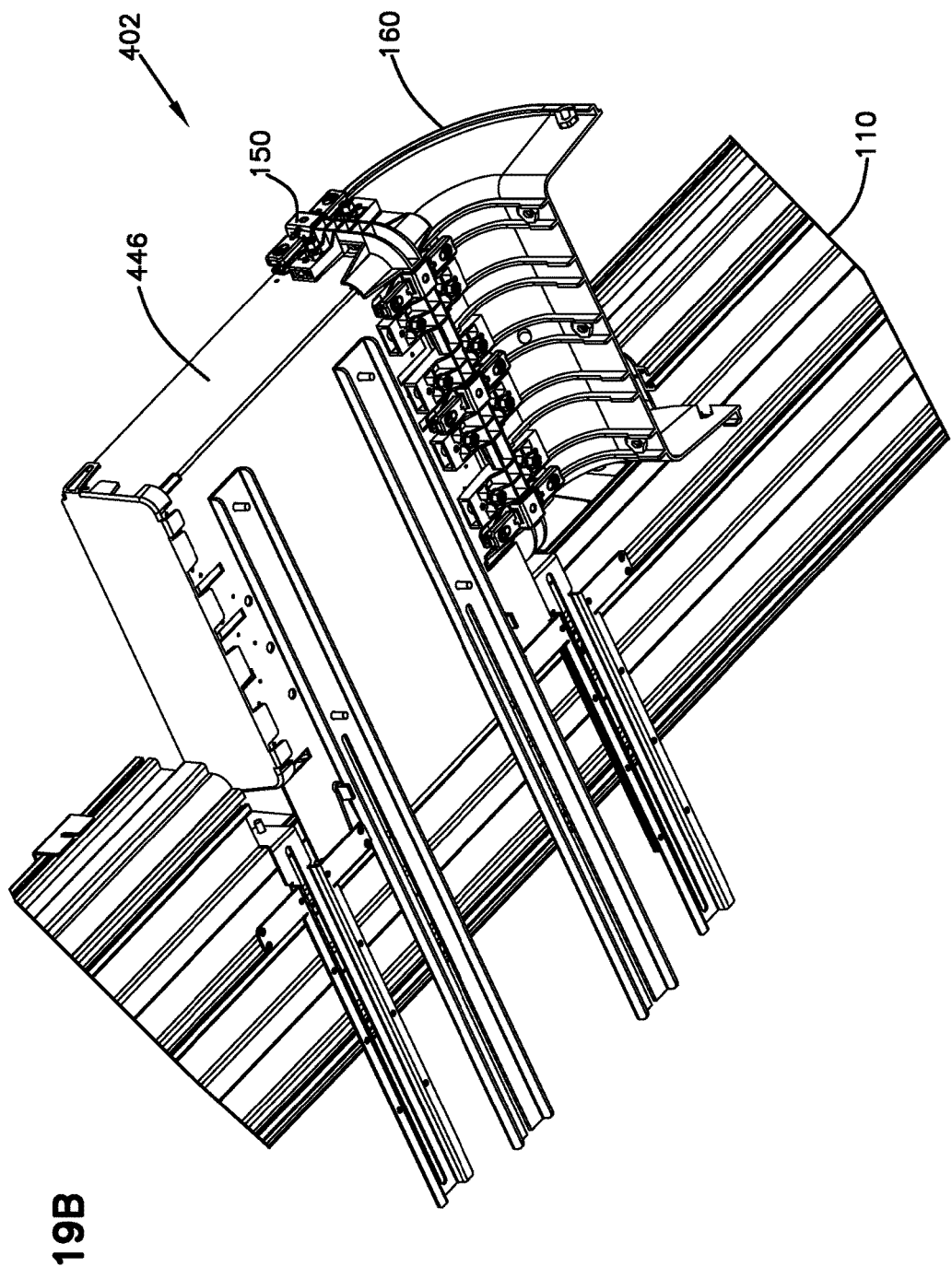
Figure 19C:
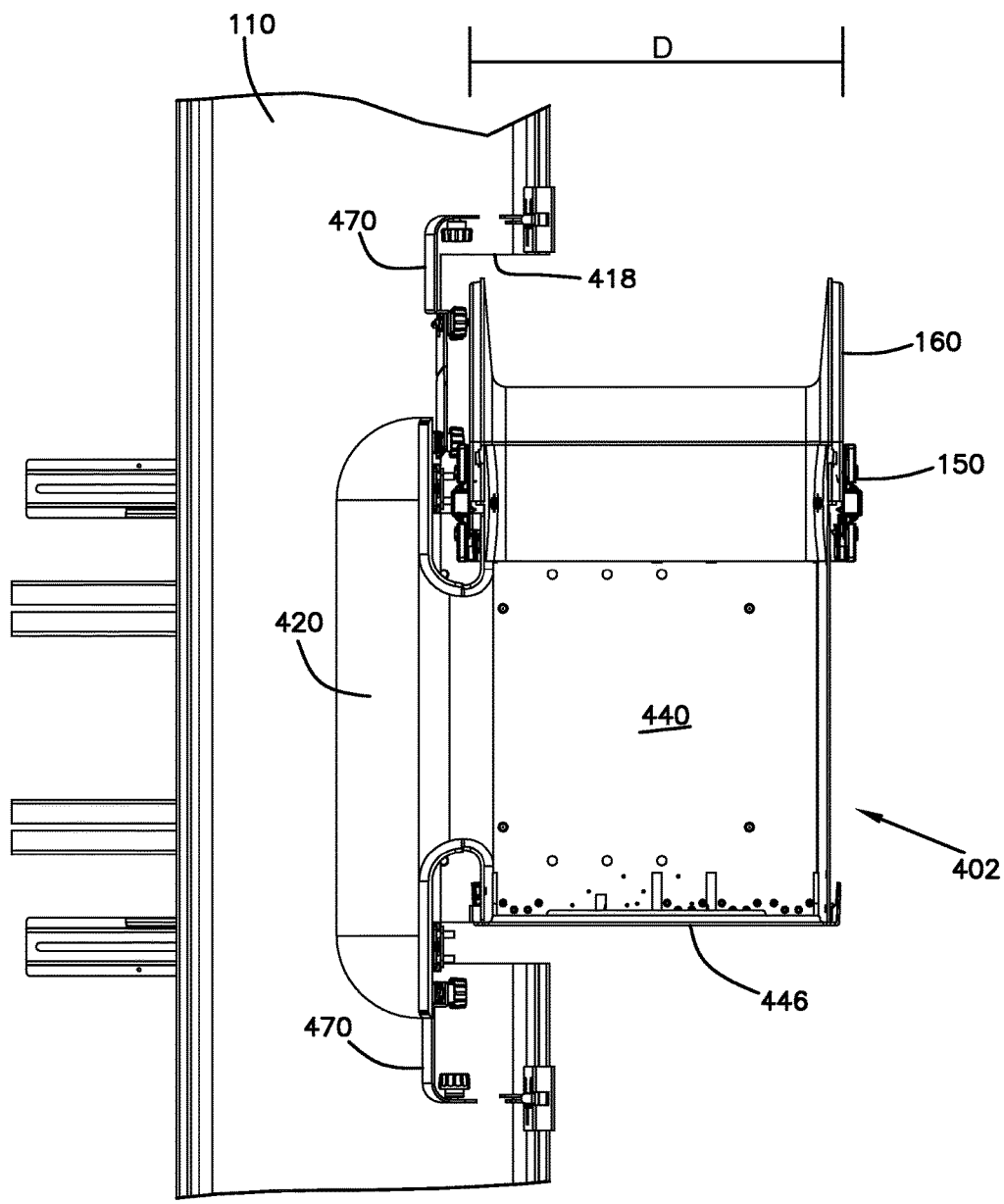

FIGS. 15 and 16 show a 24 inch lateral trough 110, and a 6 inch opening 418. Various downspouts or trumpets can be added to plate 440.

FIGS. 17A-D show a 12 inch lateral trough 110, and a 4 inch exit structure 402, with a flush opening 418.

FIGS. 18A-D show a 12 inch lateral trough 110, and a 4 inch exit structure 402, with a 4 inch opening 418.

FIGS. 19A-D show a 12 inch lateral trough 110, and a 12 inch exit structure 402, with a 4 inch opening 418.

FIG. 20 shows a 24 inch lateral trough 110, and a 6 inch exit structure 402, with a 6 inch opening 418.

FIG. 21 shows a lateral trough 110 with a flush opening 418, with an exit structure 402 extending out 12 inches, and including a 4 inch downspout 160. Downspout 160 extends a distance D and downspout 160 has a width D'. FIG. 21 illustrates the additional variations possible with moveable plate 440 and/or different cutouts in the lateral trough 110. Brackets 470, and walls 446 and 490 can further add variations for the user.

Systems 100, 300, 400 offer a number of variations in placement of the exit structure. These variations can be used singly, or together in various combinations. One variation is the depth of opening 418 as in system 400. Another variation is the length of opening 418. A further variation is the location of exit structure 402 in opening 418 in the lateral direction, such as left, right, or central. Another variation is the amount of extension for plate 440. Another variation is the size of downspout 160 or trumpet 460. A further variation is the type of brackets 470 and walls 446, 490 that can be used and where they can be located. These parts can be adjustable in length if desired, such as by using parts with predefined breakaway sections.

Figure 24:
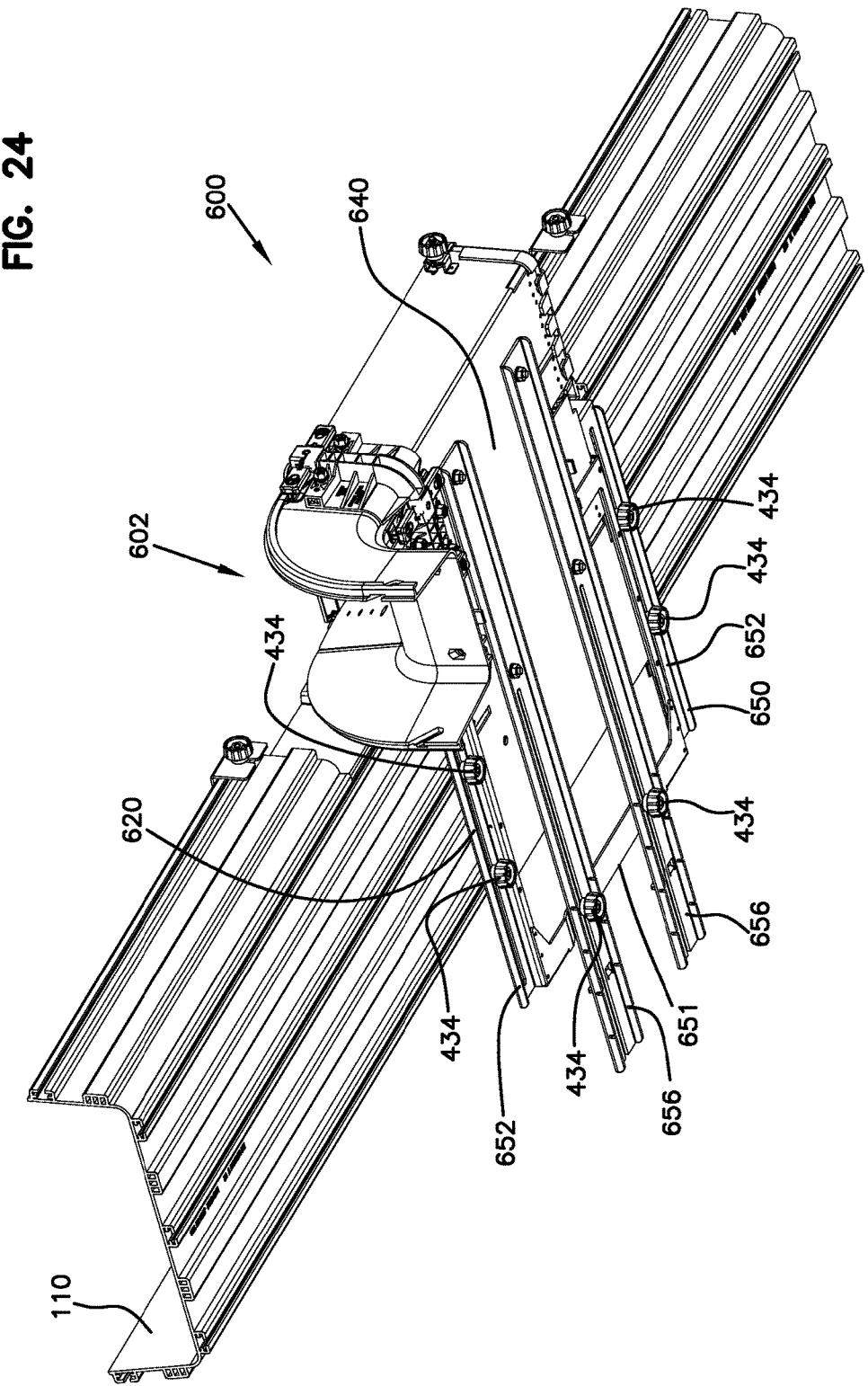
FIG. 24 is a bottom view of a twelfth embodiment of the cable routing system of FIG. 1.

Referring now to FIG. 24, an example system 600 is shown. The exit structure 602 includes a fitting 620 mounted to lateral trough 110. Fitting 620 includes brackets 652 which mount with connectors 434 to trough 110. Brackets 652 and a cross member 651 form a framework 650. Framework 650 holds slideable plate 640 which is moveable relative to framework 650 and trough 110. Support brackets 656 are coupled to the plate 640 with fasteners, such as bolts, and to the framework 650 with connectors 434. A rail/slot arrangement is positioned between the plate 640 and brackets 652.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An exit structure for a cable routing system, the exit structure comprising:
   a fitting configured to be coupled to a lateral trough, the fitting including first and second arms extending perpendicularly with respect to a longitudinal direction, wherein the fitting further comprises first and second members, with each of the first and second members defining a curved wall to guide the fiber optic cable as the fiber optic cable exits the lateral trough and enters the exit structure;
   a plate positioned relative to the fitting, wherein the plate is configured to slide relative to the fitting to adjust a distance the plate extends perpendicularly from a base of the lateral trough; and
   an exit component coupled to the plate, the exit component defining a surface directing a fiber optic cable out of the exit structure.

2. The exit structure of claim 1, wherein the arms of the fitting define grooves in which the plate slides.

3. The exit structure of claim 1, wherein the first and second members are each positioned relative to the first and second arms to define spaces therebetween, the spaces being sized to receive a portion of the base of the lateral trough to couple the exit structure to the lateral trough.

4. The exit structure of claim 1, wherein the exit component is a downspout.

5. The exit structure of claim 4, further comprising a coupler positioned between the plate and the downspout to couple the downspout to the plate.

6. A cable routing system, comprising:
   a lateral trough extending in a longitudinal direction to define a cable pathway, the lateral trough including a base and first and second upstanding sidewalls, with one of the first and second upstanding sidewalls defining an opening extending along the lateral trough; and
   an exit structure coupled to the lateral trough at the opening of the lateral trough, the exit structure including:
   a fitting coupled to the lateral trough, the fitting including first and second arms extending perpendicularly with respect to the longitudinal direction;
   a plate positioned relative to the fitting, wherein the plate is configured to slide relative to the fitting to adjust a distance the plate extends perpendicularly from the base of the lateral trough; and
   an exit component coupled to the plate, the exit component defining a surface directing an optical cable out of the exit structure.

7. The system of claim 6, wherein the arms of the fitting define grooves in which the plate slides.

8. The system of claim 6, wherein the fitting further comprises first and second members, with each of the first and second members defining a curved wall to guide the optical cable as the optical cable exits the lateral trough and enters the exit structure.

9. The system of claim 8, wherein the first and second members are each positioned relative to the first and second arms to define spaces therebetween, the spaces being sized to receive a portion of the base of the lateral trough to couple the exit structure to the lateral trough.

10. The system of claim 6, wherein the plate further comprises a sidewall including multiple sidewall members, wherein a number of the sidewall member is configurable depending on the distance the plate extends perpendicularly from the base.

11. The system of claim 6, wherein the exit component is a downspout or a trumpet.

12. A method of routing fiber optic cables, the method comprising:
   forming an opening in a sidewall of a lateral trough;
   coupling a fitting to the lateral trough;
   sliding a plate relative to the fitting so that the plate is a desired distance in a perpendicular direction from the lateral trough;
   positioning a coupler at the plate; and
   coupling the coupler to an exit component.

13. The method of claim 12, wherein the fitting includes first and second arms that extend perpendicularly with respect to the lateral trough.

14. The method of claim 13, wherein the arms of the fitting define grooves in which the plate slides.

15. The method of claim 12, wherein the fitting further comprises first and second members, with each of the first and second members defining a curved wall to guide the fiber optic cables as the fiber optic cables exit the lateral trough.

16. The method of claim 15, wherein the first and second members are each positioned relative to first and second arms of the fitting to define spaces therebetween, the spaces being sized to receive a portion of a base of the lateral trough to couple the fitting to the lateral trough.

17. The method of claim 12, wherein the plate further comprises a sidewall including multiple sidewall members, wherein a number of the sidewall member is configurable depending on the distance the plate extends perpendicularly from a base of the lateral trough.

18. The method of claim 12, further comprising positioning the coupler between the plate and the exit component to couple the exit component to the plate.

19. The method of claim 12, further comprising adjusting the distance of the plate relative to the fitting.

20. A method of routing fiber optic cables, the method comprising:
- forming an opening in a sidewall of a lateral trough;
- coupling a fitting to the lateral trough;
- sliding a plate relative to the fitting so that the plate is a desired distance in a perpendicular direction from the lateral trough;
- positioning an exit component for cables to exit from the plate.

21. The method of claim 20, wherein the fitting includes first and second arms that extend perpendicularly with respect to the lateral trough.

22. The method of claim 21, wherein the arms of the fitting define grooves in which the plate slides.

23. The method of claim 20, wherein the fitting further comprises first and second members, with each of the first and second members defining a curved wall to guide the fiber optic cables as the fiber optic cables exit the lateral trough.

24. The method of claim 23, wherein the first and second members are each positioned relative to first and second arms of the fitting to define spaces therebetween, the spaces being sized to receive a portion of a base of the lateral trough to couple the fitting to the lateral trough.

25. The method of claim 20, further comprising positioning a coupler between the plate and a downspout or trumpet for cables to exit the plate.

26. The method of claim 20, further comprising adjusting the distance of the plate relative to the fitting to a selected distance.

27. The method of claim 20, further comprising adjusting the location of the fitting relative to the opening to a selected location.

28. The method of claim 20, further selecting a desired depth of the opening and then cutting the lateral trough to include removing at least a section of the sidewall and optionally a section of the base of the lateral trough.

29. A cable routing system, comprising:
- a lateral trough extending in a longitudinal direction; and
- an exit structure coupled to the lateral trough, wherein the exit structure defines an entrance at an opening in a sidewall of the lateral trough, and the exit structure defines an exit extending parallel to the longitudinal direction through which fiber optic cables exit the exit structure, the exit structure including:
  - a fitting coupled to the lateral trough, the fitting including first and second arms extending perpendicularly with respect to a longitudinal direction;
  - a plate positioned relative to the fitting, wherein the plate is configured to slide relative to the arms of the fitting to adjust a distance the plate extends perpendicularly from a base of the lateral trough; and
  - an exit component coupled to the plate, the exit component defining a surface directing a fiber optic cable out of the exit structure.

30. The cable routing system of claim 29, wherein the fitting includes a cross member connecting each of the two arms.

31. The cable routing system of claim 29, wherein the plate includes at least one arm for mounting to the fitting and/or the lateral trough to selectively hold the plate in position from movement relative to the fitting and the lateral trough.

* * * * *